(12) United States Patent
Kunitake

(10) Patent No.: US 6,473,531 B1
(45) Date of Patent: Oct. 29, 2002

(54) IMAGE INFORMATION CODING SYSTEM

(75) Inventor: Setsu Kunitake, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/386,354

(22) Filed: Aug. 31, 1999

(30) Foreign Application Priority Data

Sep. 18, 1998 (JP) ........................... 10-265142

(51) Int. Cl.⁷ ............................. G06K 9/36; G06K 9/46
(52) U.S. Cl. ...................................... 382/239; 382/251
(58) Field of Search ............................... 382/232, 239, 382/251; 375/240.03–240.07; 348/404.1, 405.1; 341/51

(56) References Cited

U.S. PATENT DOCUMENTS

| 5,214,507 A | * | 5/1993 | Aravind et al. | ............. | 382/239 |
| 5,323,187 A | * | 6/1994 | Park | ....................... | 375/240.04 |
| 5,357,584 A | * | 10/1994 | Yamaoka | ..................... | 382/251 |
| 5,367,629 A | * | 11/1994 | Chu et al. | ................... | 382/251 |

FOREIGN PATENT DOCUMENTS

| JP | 6-165149 | 6/1994 | .......... H04N/7/133 |
| JP | 8-111870 | 4/1996 | ............ H04N/7/32 |
| JP | 10-75369 | 3/1998 | ............ H04N/1/41 |

* cited by examiner

*Primary Examiner*—Timothy M. Johnson
(74) *Attorney, Agent, or Firm*—Morgan, Lewis & Bockius LLP

(57) ABSTRACT

An image information coding system is disclosed which analyzes an input image and which can make exact image quality control even when the input image has been subjected to coding and decoding in the previous stage. A coded image information decoding unit decodes coded image information and outputs both code attribute information and decoded image information. An image information dividing unit divides the decoded image information into rectangular regions consisting of a predetermined number pixels and outputs divided image information. An image information analyzing unit measures a statistic of the divided image information while making reference to the code attribute information and outputs image quality control information taking coding and decoding conditions in the previous stage into account. A coding parameter control unit decides a coding parameter on the basis of the image quality control information, and an image information coding unit encodes the divided image information using the coding parameter and outputs the thus-coded information.

11 Claims, 15 Drawing Sheets

FIG. 23A

IN INITIAL CODING $C_0$

| 277 | -143 | 126 | 60 | -61 | 6 | -2 | 11 |
|---|---|---|---|---|---|---|---|
| -77 | 188 | 204 | 27 | -130 | 31 | -15 | 16 |
| 146 | -42 | -107 | -95 | -87 | 44 | -31 | 5 |
| -138 | -88 | -28 | 36 | 100 | 17 | 6 | -1 |
| 20 | 107 | 57 | 40 | 26 | -28 | -5 | -11 |
| -20 | -27 | 4 | -6 | -18 | -17 | -39 | -24 |
| -16 | 18 | 6 | -39 | -15 | 1 | 7 | 20 |
| 33 | -7 | -26 | 2 | 29 | 16 | 8 | -4 |

IN RECODING $C_0$

| 272 | -142 | 131 | 63 | -71 | 1 | -1 | 1 |
|---|---|---|---|---|---|---|---|
| -71 | 191 | 209 | 21 | -131 | 58 | 2 | -1 |
| 139 | -38 | -112 | -97 | -79 | 57 | -2 | 1 |
| -139 | -86 | -23 | 30 | 101 | 0 | 2 | -1 |
| 17 | 110 | 74 | 55 | 1 | 0 | -1 | 0 |
| -23 | -35 | -1 | 1 | 0 | 0 | 1 | -1 |
| -1 | 0 | 0 | -1 | 0 | 0 | -1 | 1 |
| 0 | 0 | 0 | 0 | 0 | 0 | 0 | 0 |

$C_{63}$

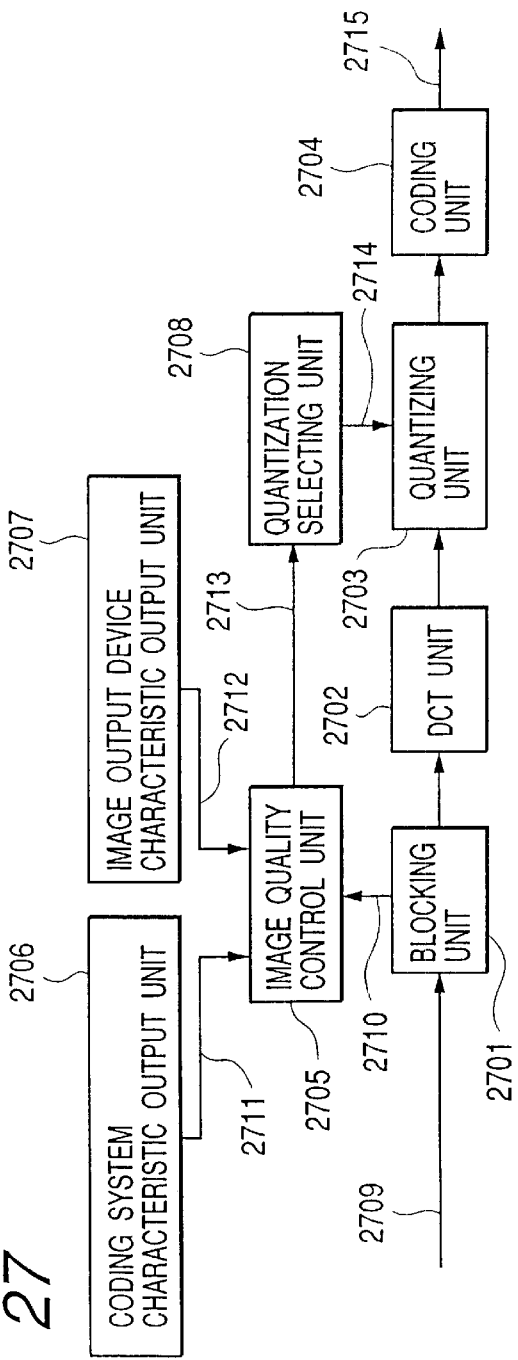
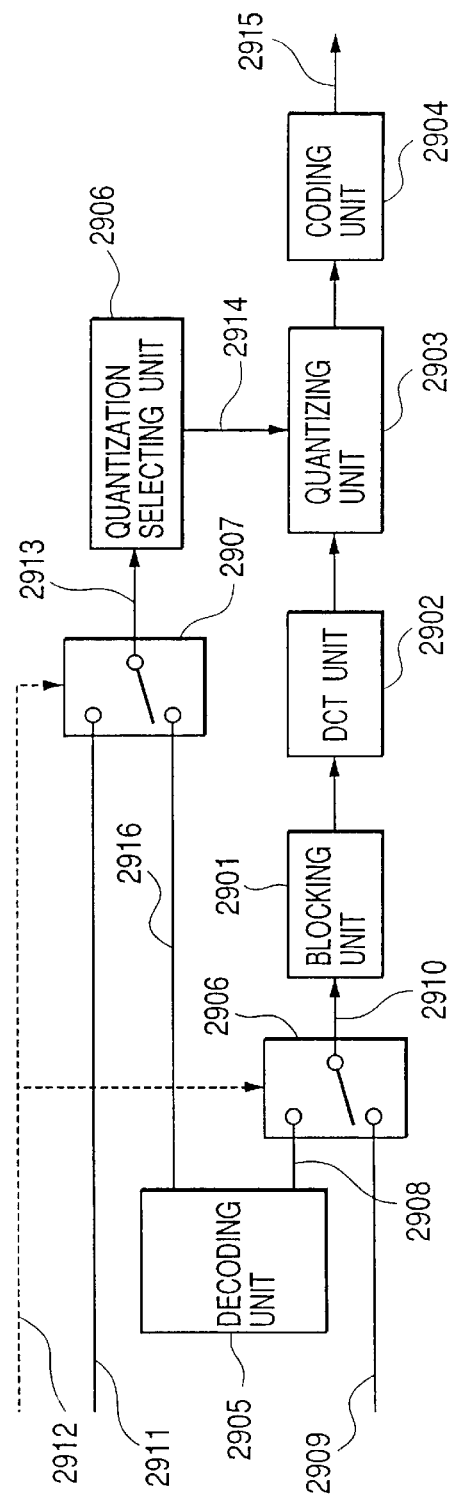

IMAGE INFORMATION CODING SYSTEM

BACKGROUND OF THE INVENTION

1. Field of the Invention

The present invention relates to a system for decoding coded digital image information and subjecting the decoded digital image information to recording.

2. Description of the Related Art (Remote Printing System)

Recently, a remote printing system has become popular in which an image output device is connected to a network and the output of an image is indicated from a terminal on the network. Various digital images are handled therein, including those inputted from a scanner, those generated by a computer, and those transmitted through a network. With higher definition of digital images and colorization, a demand now exists for an image processing technique capable of attaining both high speed and high image quality.

In such a system, an image is generally handled after coding for the purpose of reducing the image transmission time and storage capacity.

(Necessity of Precollation Technique)

In a remote printing system with an image output device of high speed and high resolution connected thereto, a precollation technique is needed for operating the image output device efficiently. According to this technique, for continuous output of a large amount of images, images are stored in a storage device and are read from the same device in conformity with the speed of the image output device after sorting if necessary. In this case, image coding is absolutely necessary for the following two reasons. (The image coding will be referred to below in the same sense as image compression.)

(1) Reducing the Storage Capacity

Colored image information of a high definition is very large in the amount of information. In a printing system which handles a large amount of information, it is necessary in point of cost to reduce the amount of information by image compression before storage.

(2) Shortening the Read Time of a Storage Device

For storing a large amount of digital images there usually is employed an HDD as a storage device. Since the HDD is low in its read/write processing speed, it is necessary that the amount of input and output data be reduced in advance, or else it will become impossible to follow up the processing speed of an image output device.

Among the images handled by the system are included those (hereinafter referred to as "coded images") which are inputted in an already coded state for the purpose of reducing the transmission time for example. In many cases, coded images are different in code format from those for precollation or require image processing such as color conversion or resolution conversion, so they are usually once decoded and are then coded again, which coded images are stored.

(High Efficient Image Coding)

As image coding methods there are known a reversible method and an irreversible method. In the reversible method, an image (hereinafter referred to as "decoded image") which has been subjected to coding and decoding coincides completely with the original image. On the other hand, in the irreversible method, a decoded image does not coincide completely with the original image and the image quality may be degraded at a certain compression rate. The foregoing printing system often adopts the irreversible method in which a high compression rate can be expected.

(Problem involved in Irreversible Coding)

Generally, in irreversible coding, the higher the compression rate is, the lower the quality of a decoded image is ("decoded image quality" hereinafter), assuming that coding conditions are the same. That is, the compression rate and the decoded image quality are in a relation of trade-off. This is because the irreversible coding realizes a high compression rate by discarding information which is considered relatively difficult to influence the vision in the image concerned. Thus, if the compression rate is low, the amount of information discarded is small and there is attained a good decoded image quality, but if the compression rate is high, the amount of information discarded increases, resulting in degradation of the decoded image quality.

In the foregoing printing system there is a strong demand for a high compression rate and a high decoded image quality. Therefore, a decoded image quality control method is needed which can guarantee a high image quality and achieve the maximum compression rate.

(Conventional Decoded Image Quality Controlling Method in the Irreversible Coding Technique)

In an image there exists a region easy to be compressed and a region difficult to be compressed. Decoded image quality control applied to the irreversible coding technique is realized by analyzing image characteristics and deciding a coding parameter suitable for each region. For example, as a coding method to which such a decoded image quality control is applied, there is known an "image coding control method" (see Japanese Published Unexamined Patent Application No. Hei 6-165149), the construction of which is shown in FIG. 26.

In this example, as a coding method there is illustrated a combined method of DCT (Discrete Cosine Transform) and conversion coefficient quantization, in which the quantizing step size (quantization matrix) is changed over from one to another for image quality control.

In FIG. 26, the numeral 2601 denotes a blocking unit, numeral 2602 denotes a DCT unit, 2603 denotes quantizing unit, 2604 denotes a coding unit, 2605 denotes an image quality control unit, 2606 denotes a quantization selecting unit, 2607 denotes input image information, 2608 denotes blocked image information, 2609 denotes image quality control information, 2610 denotes quantization matrix information, and 2611 denotes coded image information.

The image quality control unit 2605 measures a statistic of the blocked image information and outputs the image quality information 2609. In accordance with the image quality control information 2609 the quantization selecting unit 2606 decides a quantization matrix. More specifically, if it is determined in the image quality control unit 2605 that the blocked image information is an image involving a coding distortion called mosquito noise, a quantization matrix difficult to cause a coding distortion (small in the quantizing step size) is selected in the quantization selecting unit 2606. As a result, it becomes possible to suppress the occurrence of a coding distortion.

As another example of a coding method with the decoded image quality control applied thereto there is "an image quality predicting apparatus and method as well as an image quality controlling apparatus and method" (Japanese Published Unexamined Patent Application No. Hei 10-075369), whose construction is shown in FIGS. 27 and 28. The coding method is a combined method of DCT and conversion coefficient quantization, in which there is used a technique of changing over from one quantization matrix to another for image quality control.

In FIG. 27, the numeral 2701 denotes a blocking unit, numeral 2702 denotes a DCT unit, numeral 2703 denotes a quantizing unit, numeral 2704 denotes a coding unit, numeral 2705 denotes an image quality control unit, numeral 2706 denotes a coding system characteristic output unit, numeral 2707 denotes an image output device characteristic output unit, numeral 2708 denotes a quantization selecting unit, numeral 2709 denotes input image information, 2710 denotes blocking image information, 2711 denotes coding system characteristic information, 2712 denotes image output device characteristic information, 2713 denotes image quality control information, 2714 denotes quantization matrix information, and 2715 denotes coding image information.

In FIG. 28, the numeral 2801 denotes an image quality degradation item-by-item coding device characteristic output unit, numeral 2802 denotes an image quality degradation item-by-item image analyzing unit, numeral 2803 denotes an image quality degradation item-by-item output device characteristic output unit, numeral 2804 denotes an image quality item-by-item determining unit, and numeral 2805 denotes an image quality control information output unit.

The image quality degradation item indicates an image quality degradation resulting from image compression, namely, the type of a coding distortion. Examples of coding distortions include "blur," "pseudo contour," and "mosquito noise."

As noted previously, the coding method is a combination of DCT and conversion coefficient quantization. The image quality is controlled changing over from one quantization matrix to another.

For deciding a quantization matrix, the image quality control unit 2705 operates in the following manner. An image quality degradation item "a" coding device characteristic output unit 2801a extracts only characteristics related to an image quality degradation item "a" from the coding system characteristic information 2711 and inputs them to an image quality degradation item "a" determining unit 2804a. Likewise, an image quality degradation item "a" output device characteristic output unit 2803a extracts only characteristics related to the image degradation item "a" from the image output device characteristic information 2712 and inputs them to an image quality degradation item "a" determining unit 1804a. An image quality degradation item "a" image analyzing unit 2802a measures a characteristic quantity of an image related to the image quality degradation item "a" and inputs the result to the image quality degradation item "a" determining unit 2804a. On the basis of the coding system characteristic information, image output device characteristic information and image analysis information, which are related to the image quality degradation item "a," the image quality degradation item "a" determining unit 2804a predicts the degree of occurrence of the image quality degradation item "a" and inputs the result to the image quality control information output unit 2805. Also as to the other image quality degradation items, the same operations as above are repeated. The image quality control information output unit 2805 outputs as the image quality control information 2713 the result of having applied an appropriate weighting process to the input information provided from the image quality degradation item-by-item determining unit.

In this example, attention is paid to coding distortions, and coding system characteristics, image output device characteristics and image characteristics, which exert an influence on the degree of occurrence of coding distortions, are subdivided item by item and are handled in such a subdivided state, whereby the accuracy of image quality control can be improved.

In the above method wherein the image quality control is made by utilizing image analysis information, the accuracy of image characteristic analysis exerts a great influence on the accuracy of image quality control. This is because image characteristics differ greatly for each input image and vary locally even in a single image in comparison with coding device characteristics and image output system characteristics which are both fixed within the system in many cases.
(Problems of the Related Art)

In the printing system, as noted previously, a coded image is sometimes decoded and is then coded again. Therefore, it is necessary to consider the case where an image obtained by decoding a coded image is inputted to the foregoing conventional coding device. When a decoded image obtained by decoding a coded image is inputted, the control of image quality is considered difficult in comparison with the input of an image ("non-coded image" hereinafter) not having been subjected to coding and decoding. It is presumed that this is for the following reasons.

(1) A coded image inputted from the exterior is not guaranteed to have good image quality, that is, a possibility exists that a coding distortion may have occurred already. It is impossible to control such an image so that the "degradation of its image quality is below a detection limit" for example, like a non-coded image. Further, if a coded image has been coded at a very high compression rate and if the degradation of its image quality is marked, it is not so meaningful to make an image quality control.

(2) In a decoded image, in many cases, a high-frequency component which has been contained in the original image is lost by a coding process, or a noise component which has been contained in the original image is emphasized. Consequently, it is difficult to analyze and detect an edge area or a flat area.

That is, in the case of coding a decoded image obtained by decoding a coded image, it is desirable to predict the degree of its image quality degradation and handle the image differently from a non-coded image.
(Conventional Coding Method assuming the Input of a Decoded Image)

As a coding system which assumes the input of a decoded image obtained by decoding a coded image and which handles the image differently from a non-coded image, there is known an "image information recording method and apparatus" (Japanese Published Unexamined Patent Application No. Hei 8-111870). FIG. 29 shows a schematic construction of the apparatus. As the coding method there is adopted a combined method of DCT and conversion coefficient quantization, with a technique of changing over from one quantization matrix to another being applied thereto.

In FIG. 29, the numeral 2901 denotes a blocking unit, numeral 2902 denotes a DCT unit, numeral 2903 denotes a qunatizing unit, numeral 2904 denotes a coding unit, numeral 2905 denotes a coded image information decoding unit, numeral 2906 denotes a quantization selecting unit, numeral 2907 denotes a characteristic information change-over unit, numeral 2908 denotes decoded image information, numeral 2909 denotes input image information, numeral 2910 denotes selected image information, numeral 2911 denotes image characteristic information, numeral 2912 denotes change-over information, numeral 2913 denotes selected characteristic information, numeral 2914 denotes quantization matrix information, numeral 2915 denotes coded image information, and numeral 2916 denotes code attribute information.

According to this conventional apparatus, when the selection of the decoded image information 2908 is designated as an image to be coded by the change-over information 2912, the characteristic information change-over unit 2907 selects the code attribute information 2916 which is outputted from the coded image information decoding unit 2905 and provides it to the quantization selecting unit 2906, which in turn decides a quantization matrix while utilizing information such as a coding parameter obtained from the coded image information 2905.

In the case where input image information 2909 is selected as an image to be coded, characteristic information of the input image for example is inputted as the image characteristic information 2911 and a quantization matrix is decided by utilizing this information.

In the case where the image inputted to the coding unit is a decoded image outputted from the decoding unit, the coding control unit utilizes the previous coding parameter outputted from the decoding unit and decides a coding parameter to be used in recording. However, it is impossible to guarantee a satisfactory image quality because there is not used a mechanism for analyzing image and controlling a decoded image.

SUMMARY OF THE INVENTION

The present invention has been accomplished in view of the above-mentioned circumstances and it is an object of the invention to provide, in a coding system of analyzing an input image and performing an image quality control by using the result of the analysis, a coding technique which, in the case of once decoding a coded image and thereafter coding the decoded image, predicts a coding distortion of the decoded image and the degree of influence thereof on the analysis of image information, on the basis of attribute information of the coded image, and which then corrects an analyzing unit in accordance with the result obtained, thereby improving the accuracy of image analysis and permitting the image quality control to be done more accurately. It is another object of the present invention to prevent the compression rate from being kept low as a result of meaningless image quality control for a decoded image involving an image quality degradation which is caused by a coding distortion. It is a further object of the present invention to notify the user that the control of image quality cannot be done to a satisfactory extent, in the case of marked degradation of in image quality of a decoded image to be coded.

According to the present invention, in order to achieve the above-mentioned objects, there is provided, in the first aspect thereof, an image information coding system comprising a coded image information decoding unit (101) that decodes input coded image information coded by a first image information coding unit and outputs first decoded image information and code attribute information, an image information dividing unit (102) that divides the first decoded image information outputted from the decoding unit into rectangular regions consisting of a predetermined number of pixels, an image information analyzing unit (103) that measures a statistic of divided image information outputted from the image information dividing unit and analyzes to what degree the divided image information is apt to be degraded in its image quality by coding, the image information analyzing unit (103) then outputting image quality control information, a coding parameter control unit (104) that decides a coding parameter for obtaining a desired image quality with respect to second decoded image information in accordance with the image quality control information, the second decoded image information being the result of coding and decoding of the first decoded image information, and a second image information coding unit (105) that encodes the above divided image information with use of the coding parameter outputted from the coding parameter control unit. On the basis of the code attribute information outputted from the coded image information decoding unit, the image information analyzing unit predicts the degradation of the first decoded image information and the degree of influence thereof on the image information analysis, then makes correction in accordance with the result of the prediction, and thereafter analyzes the above divided image information.

According to this construction, in the case of decoding inputted coded image information and then recording the thus-decoded image information, the attribute information which the coded image information possesses is utilized and it is predicted to what degree the decoded image is degraded its image quality and to what degree the image analysis is influenced by the image quality degradation. The image information analyzing unit is corrected in accordance with the result of the prediction and thereafter an analysis is made, so that it becomes possible to determine a more appropriate coding parameter.

In connection with the above construction there may be adopted a construction wherein the image information analyzing unit is provided with an analysis parameter deciding unit that decides a parameter for statistic measurement and an image analysis value calculating unit that, with use of an analysis parameter outputted from the analysis parameter deciding unit, measures the statistic of the divided image information and outputs image control information, the analysis parameter deciding unit predicting the degradation of the first decoded image information and the degree of influence thereof on the image information analysis on the basis of the code attribute information outputted from the coded image information decoding unit, and deciding the analysis parameter in accordance with the result of the prediction.

In connection with the above construction there may be adopted a construction wherein the image information analyzing unit is provided with at least one image quality degradation item-by-item image information analyzing unit that measures the statistic of the divided image information outputted from the image information dividing unit and analyzes to what degree the divided image information is apt to be degraded in its image quality by coding with respect to a single image degradation item, and an image quality control information calculating unit that calculates image quality control information from at least one piece of image quality degradation item-by-item image analysis information outputted from the image quality degradation item-by-item image information analyzing unit, the image quality degradation item-by-item image information analyzing unit predicting the degradation of the first decoded image information and the degree of influence thereof on the image information analysis on the basis of the code attribute information outputted from the coded image information decoding unit, then making correction in accordance with the result of the prediction and thereafter analyzing the divided image information.

In connection with the construction just described above there may be adopted a construction wherein the image quality degradation item-by-item image information analyzing unit is provided with an image quality degradation item-by-item analysis parameter deciding unit that decides a parameter for statistic measurement and an image quality degradation item-by-item image analysis value calculating unit that measures the statistic of the divided image information with use of an image quality degradation item-by-item analysis parameter outputted from the image quality degradation item-by-item analysis parameter deciding unit, the image quality degradation item-by-item analysis parameter deciding unit predicting the degradation of the first decoded image information and the degree of influence thereof on the image information analysis on the basis of the code attribute information outputted from the coded image information decoding unit, and deciding the image quality degradation item-by-item analysis parameter in accordance with the result of the prediction.

In connection with this construction there may be adopted a construction wherein the image information analyzing unit is provided with at least one image quality degradation item-by-item image information analyzing unit that measures the statistic of the divided image information outputted from the image information dividing unit and analyzes to what degree the divided image information is apt to be degraded in its image quality by coding with respect to a single image degradation item, an analysis value calculation coefficient deciding unit that decides a calculation coefficient, and an image quality information calculating unit that uses the calculation coefficient outputted from the analysis value calculation coefficient deciding unit in the case of calculating image quality control information from at least one piece of image quality degradation item-by-item image analysis information outputted from the image quality degradation item-by-item image information analyzing unit, the analysis value calculation coefficient deciding unit predicting the degradation of the first decoded image information and the degree of influence thereof on the image information analysis on the basis of the code attribute information outputted from the coded image information decoding unit, and deciding the calculation coefficient in accordance with the result of the prediction.

In the second aspect of the present invention there is provided an image information coding system comprising a coded image information decoding unit (101) that decodes input coded image information coded by first image information coding unit and outputs first decoded image information and code attribute information, an image information dividing unit (102) that divides the first decoded image information outputted from the decoding unit into rectangular regions consisting of a predetermined number of pixels, an image output device information output unit (301) that outputs characteristic information of an image output device, an image information analyzing unit (302) that measures a statistic of divided image information outputted from the image information dividing unit and analyzes to what degree the divided image information is apt to be degraded in its image quality by coding, the image information analyzing unit (302) then outputting image quality control information, a coding parameter control unit (104) that decides a coding parameter for obtaining a desired image quality with respect to second decoded image information in accordance with the image quality control information, the second decoded image information being the result of coding and decoding of the first decoded image information, and a second image information coding unit (105) that encodes the above divided image information with use of the second coding parameter outputted from the coding parameter control unit. On the basis of the coded attribute information outputted from the coded image information decoding unit, the image information analyzing unit predicts the degradation of the first decoded image information and the degree of influence thereof on the image information analysis, then makes correction in accordance with the result of the prediction and the image output device characteristic information outputted from the image output device information output unit, and thereafter analyzes the divided image information.

According to this construction, since the image output device information is utilized in image information analysis and image quality control, it becomes possible to effect image quality control with higher accuracy and hence possible to determine an appropriate coding parameter.

In connection with this construction there may be adopted a construction wherein the image information analyzing unit is provided with at least one image quality degradation item-by-item image information analyzing unit that measures the statistic of the divided image information outputted from the image information dividing unit and analyzes to what degree the divided image information is apt to be degraded in its image quality by coding with respect to a single image quality degradation item, an analysis value calculation coefficient deciding unit that decides a calculation coefficient, and an image quality control information calculating unit that uses the calculation coefficient outputted from the analysis value calculation coefficient deciding unit in the case of calculating an image analysis result from at least one piece of image quality degradation item-by-item image analysis information outputted from the image quality degradation item-by-item image information analyzing unit, the analysis value calculation coefficient deciding unit predicting the degradation of the first decoded image information and the degree of influence thereof on the image information analysis on the basis of the code attribute information outputted from the coded image information decoding unit, and deciding the calculation coefficient in accordance with the result of the prediction and the image output device characteristic information outputted from the image output device information output unit.

In the third aspect of the present invention there is provided an image information coding system comprising a coded image information decoding unit (101) that decodes input coded image information coded by a first image information coding unit and outputs first decoded image information and code attribute information, an image information selecting unit (701) that selects either the first decoded image information outputted from the decoding unit or non-decoded image information inputted from the exterior, an image information dividing unit (102) that divides the selected image information outputted from the image information selecting unit into rectangular regions consisting of a predetermined number of pixels, an image information analyzing unit (702) that measures a statistic of divided image information outputted from the image information dividing unit and analyzes to what degree the divided image information is apt to be degraded in its image quality by coding, a coding parameter control unit (104) that decides a coding parameter for obtaining a desired image quality with respect to second decoded image information, the second decoded image information being the result of coding and decoding of the first decoded image information, and a second image information coding unit (105) that encodes the above divided image information with use of the coding parameter outputted from the coding parameter control unit. In the case where the selected image information corresponds to the first decoded image information, the image information analyzing unit predicts the degradation of the first decoded image information and the degree of influence thereof on the image information analysis on the basis of the code attribute information outputted from the coded image information decoding unit, then makes correction in accordance with the result of the prediction and thereafter analyzes the divided image information.

According to this construction, coding processing having been subjected to image quality control can be performed not only for the decoded image information outputted from the coded image information decoding unit but also for image information inputted from the exterior.

In connection with this construction there may be adopted a construction wherein the image information analyzing unit is provided with an analysis parameter deciding unit that decides a parameter for statistic measurement and an image analysis value calculating unit that measures the statistic of the divided image information with use of an analysis parameter outputted from the analysis parameter deciding unit, the analysis parameter deciding unit, in the case of the selected image information being the first decoded image information, predicting the degradation of the first decoded image information and the degree of influence thereof on the image information analysis on the basis of the code attribute information outputted from the coded image information decoding unit, and deciding and outputting the analysis parameter in accordance with the result of the prediction, or outputting a predetermined analysis parameter in the case of the selected image information being a non-coded image information inputted from the exterior.

In connection with this construction there may be adopted a construction wherein the image information analyzing unit is provided with at least one image quality degradation item-by-item image information analyzing unit that measures a statistic of the divided image information outputted from the image information dividing unit and analyzes to what degree the divided image information is apt to be degraded in its image quality by coding with respect to a single image quality degradation item, and an image quality control information calculating unit that calculates image quality control information from at least one piece of image quality degradation item-by-item image analysis information outputted from the image quality degradation item-by-item image information analyzing unit, the image quality degradation item-by-item image information analyzing unit, in the case of the selected image information being the first decoded image information, predicting the degradation of the first decoded image information and the degree of influence thereof on the image information analysis on the basis of the code attribute information outputted from the coded image information decoding unit, then making correction in accordance with the result of the prediction and thereafter analyzing the divided image information.

In connection with this construction there may be adopted a construction wherein the image quality degradation item-by-item image information analyzing unit is provided with an image quality degradation item-by-item analysis parameter deciding unit that decides a parameter for statistic measurement and an image quality degradation item-by-item image analysis value calculating unit that measures the statistic of the divided image information with use of an image quality degradation item-by-item analysis parameter outputted from the image quality degradation item-by-item analysis parameter deciding unit, the image quality degradation item-by-item analysis parameter deciding unit, in the case of the selected image information being the first decoded image information, predicting the degradation of the first decoded image information and the degree of influence thereof on the image information analysis on the basis of the code attribute information outputted from the coded image information decoding unit, and deciding and outputting the image quality degradation item-by-item analysis parameter in accordance with the result of the prediction, or outputting a predetermined image quality degradation item-by-item analysis parameter in the case of the selected image information being non-coded image information inputted from the exterior.

In connection with this construction there may be adopted a construction wherein the image information analyzing unit is provided with at least one image quality degradation item-by-item image information analyzing unit that measures the statistic of the divided image information outputted from the image information dividing unit and analyzes to what degree the divided image information is apt to be degraded in its image quality by coding with respect to a single image quality degradation item, and an image quality control information calculating unit that uses the calculation coefficient outputted from the analysis value calculation coefficient deciding unit in the case of calculating image quality control information from at least one piece of image quality degradation item-by-item image analysis information outputted from the image quality degradation item-by-item image information analyzing unit, the analysis value calculation coefficient deciding unit, in the case of the selected image information being the first decoded image information, predicting the degradation of the first decoded image information and the degree of influence thereof on the image information analysis on the basis of the code attribute information outputted from the coded image information decoding unit, and deciding and outputting the calculation coefficient in accordance with the result of the prediction, or outputting a predetermined calculation coefficient in the case of the selected image information being non-coded image information inputted from the exterior.

In the fourth aspect of the present invention there is provided an image information coding system comprising a coded image information decoding unit (101) that decodes input coded image information coded by a first image information coding unit and outputs first decoded image information and code attribute information, an image information selecting unit (701) that selects either the first decoded image information outputted from the decoding unit or non-coded image information inputted from the exterior, an image information dividing unit (102) that divides the selected image information outputted from the image information selecting unit into rectangular regions consisting of a predetermined number of pixels, an image output device information output unit (301) that outputs characteristic information of an image output device, an image information analyzing unit (901) that measures a statistic of the divided image information outputted from the image information dividing unit and analyzes to what degree the divided image information is apt to be degraded in its image quality by coding, a coding parameter control unit (104) that decides a coding parameter for obtaining a desired image quality with respect to second decoded image information, the second decoded image information being the result of coding and decoding of the first decoded image information, and a second image information coding unit (105) that encodes the divided image information with use of the second coding parameter outputted from the coding parameter control unit. In the case where the selected image information is the first decoded image information, the image information analyzing means predicts the degradation of the first decoded image information and the degree of influence thereof on the image information analysis on the basis of the code attribute information outputted from the coded image information decoding means, then makes correction in accordance with the result of the prediction and the image output device characteristic information outputted from the image output device information output means, or makes correction in accordance with the image output device characteristic information in the case of the selected image information being non-coded image information inputted from the exterior, and thereafter analyzes the divided image information.

According to this construction, coding processing having been subjected to image quality control can be performed not only for the decoded image information outputted from the coded image information decoding unit but also for image information inputted from the exterior.

According to this construction, moreover, since the image output device information is utilized in image information analysis and image quality control, it becomes possible to effect an image quality control with higher accuracy and hence possible to obtain an appropriate coding parameter.

In connection with this construction there may be adopted a construction wherein the image information analyzing means is provided with at least one image quality degradation item-by-item image information analyzing means that measures a statistic of the divided image information outputted from the image information dividing means and analyzes to what degree the divided image information is apt to be degraded in its image quality by coding with respect to a single image quality degradation item, an analysis value calculation coefficient deciding means that decides a calculation coefficient, and an image analysis value deciding means that uses the calculation coefficient outputted from the analysis value calculation coefficient deciding means in the case of calculating an image analysis result from at least one piece of image quality degradation item-by-item image analysis information outputted from the image quality degradation item-by-item image information analyzing means, the analysis value calculation coefficient deciding means, in the case of the selected image information being the first decoded image information, predicting the degradation of the first decoded image information and the degree of influence thereof on the image information analysis on the basis of the code attribute information outputted from the coded image information decoding means, and deciding the calculation coefficient in accordance with the result of the prediction and the image output device characteristic information outputted from the image output device information outputting means or in accordance with the image output device characteristic information in the case of the selected image information being a non-coded image information inputted from the exterior.

In the image information coding system according to the above first or second aspect of the present invention, the coding parameter control means may be constructed so as to predict the degradation of the first decoded image information and the degree of influence thereof on the image information analysis on the basis of the code attribute information outputted from the coded image information decoding means, and then decide the coding parameter in accordance with the result of the prediction.

In the image information coding system according to the above first or second aspect of the present invention, the coding parameter control means may be constructed so that it is provided with a coding parameter limit value deciding means and a coding parameter deciding means and so that the coding parameter limit value deciding means predicts the degradation of the first decoded image information and the degree of influence thereof on the image information analysis on the basis of the code attribute information outputted from the coded image information decoding means, and decides a coding parameter limit value in accordance with the result of the prediction and outputs it.

In the image information coding system according to the third or fourth aspect of the present invention, the coding parameter control means may be constructed so that when the decoded image information outputted from the coding image information decoding means is selected by the image information selecting means, the coding parameter control means predicts the degradation of the first decoded image information and the degree of influence thereof on the image information analysis on the basis of the code attribute information outputted from the coded image information decoding means, and decides a coding parameter in accordance with the result of the prediction.

In the image information coding system according to the third or fourth aspect of the present invention, the coding parameter control means may be constructed so that it is provided with a coding parameter limit value deciding means and a coding parameter deciding means and so that when the decoded image information outputted from the coded image information decoding means is selected by the image information selecting means, the coding parameter limit value deciding means predicts the degradation of the first decoded image information and the degree of influence thereof on the image information analysis on the basis of the code attribute information outputted from the coded image information decoding means, and then decides a coding parameter limit value in accordance with the result of the prediction and outputs it.

In the image information coding system according to any of the first, second, third and fourth aspects of the present invention, the code attribute information may contain the first coding parameter which has been used at the time of generating the coded image information in the first image information coding means.

In the image information coding system according to any of the first, second, third and fourth aspects of the present invention, the code attribute information may contain a code quantity of the coded image information.

In the image information coding system according to any of the first, second, third and fourth aspects of the present invention, the code attribute information may contain a coding means identifying information which represents the type of the first image information coding means.

In the image information coding system according to any of the first, second, third and fourth aspects of the present invention, the same system may be further provided with an image quality control prediction notifying means (1401) that predicts whether the image quality control is proper or not and notifies image quality control prediction result information, the image quality control prediction notifying unit also to predict whether the image quality control is proper or not on the basis of the value of the code attribute information outputted from the coded image information decoding means.

According to this construction, in the case of recording the decoded image information outputted from the coded image information decoding means, it is possible to predict the degradation of the first decoded image information and the degree of influence thereof on the image information analysis on the basis of the code attribute information, and further possible to display a prediction result of the image quality control in accordance with the result of the prediction. Therefore, in the case where the degradation of image quality originally generated in the decoded image is conspicuous and it is difficult to make image quality control at the time of recording, it is possible to give up the image quality control and perform coding processing with considerable attention paid to the compression rate for example.

BRIEF DESCRIPTION OF THE DRAWINGS

FIGS. 23A and 23B are explanatory diagram showing changes of DCT coefficients in coding processing;

FIG. 27 is a schematic block diagram of a conventional coding system having an image quality control function;

FIG. 29 is a schematic block diagram of a conventional coding system for recording a decoded image.

DETAILED DESCRIPTION OF PREFERRED EMBODIMENTS

Embodiments of the present invention will be described hereunder with reference to the accompanying drawings.

First Embodiment

Figure 1:
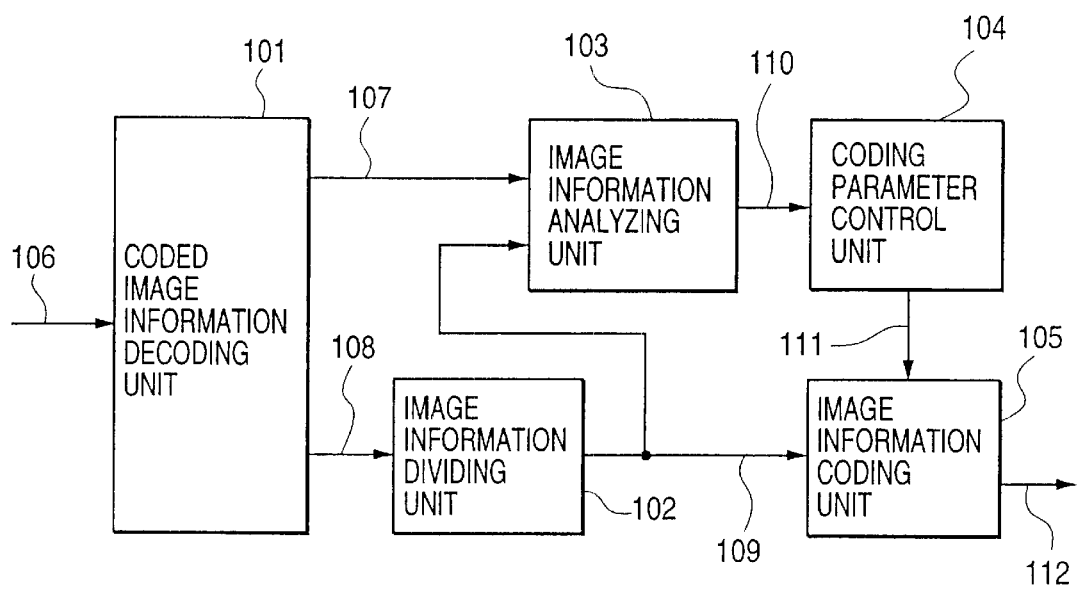
FIG. 1 is a schematic block diagram of an image information coding system according to the first embodiment of the present invention.

FIG. 1 is a block diagram showing an image information coding system according to the first embodiment of the present invention. In the same figure, the numeral 101 denotes a coded image information decoding unit, numeral 102 denotes an image information dividing unit, numeral 103 denotes an image information analyzing unit, numeral 104 denotes a coding parameter control unit, numeral 105 denotes an image information coding unit, numeral 106 denotes pre-stage coded image information, numeral 107 denotes code attribute information, numeral 108 denotes decoded image information, numeral 109 denotes divided image information, numeral 110 denotes image quality control information, numeral 111 denotes a coding parameter, and numeral 112 denotes coded image information.

Figure 2:
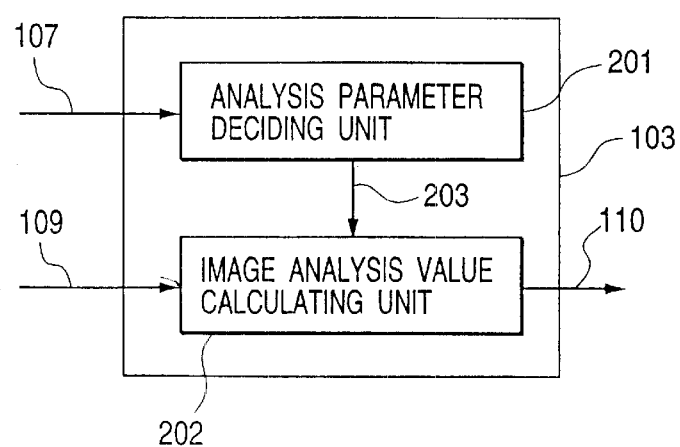
FIG. 2 is a schematic block diagram of an image information analyzing unit used in the first embodiment.

FIG. 2 is a block diagram showing the configuration of the image information analyzing unit 103. In the same figure, the numeral 201 denotes an analysis parameter deciding unit, numeral 202 denotes an image analysis value calculating unit, and numeral 203 denotes an analysis parameter.

The operation of this image information coding system will now be outlined. The coded image information decoding unit 101 decodes the pre-stage coded image information 106 inputted thereto and outputs both code attribute information 107 and decoded image information 108. The image information dividing unit 102 divides the decoded image information 108 into rectangular regions consisting of a predetermined number of pixels and outputs the divided image information 109. The image information analyzing unit 103 measures a statistic of the divided image information 109 and outputs the image quality control information 110. The code attribute information 107 is utilized in this statistic measurement. In accordance with the image quality control information 110, the coding parameter control unit 104 decides the coding parameter 111 for coding the divided image information 109 and outputs it. Using the coding parameter 111, the image information coding unit 105 encodes the divided image information 109 and outputs the coded image information 112.

In the image information analyzing unit 103, the analysis parameter deciding unit 201 decides the analysis parameter 203 and outputs it. Using the analysis parameter 203, the image analysis value calculating unit 202 calculates a statistic of the divided image information 109.

More concrete configuration and operation of this embodiment will be described below. The configurations of the image information coding unit 105, the image analysis value calculating unit 202, the analysis parameter deciding unit 201, the coded image information decoding unit 101, and the coding parameter control unit 104, which are used in the image information coding system of this embodiment, are shown in FIGS. 17, 18, 19, 20, and 21, respectively.

The coded image information decoding unit 101 and the the image information coding unit 105 are of the configuration of a conventional image coder/decoder which is also used in JPEG (Joint Photographic coding Experts Group) method like the related art.

Figure 17:
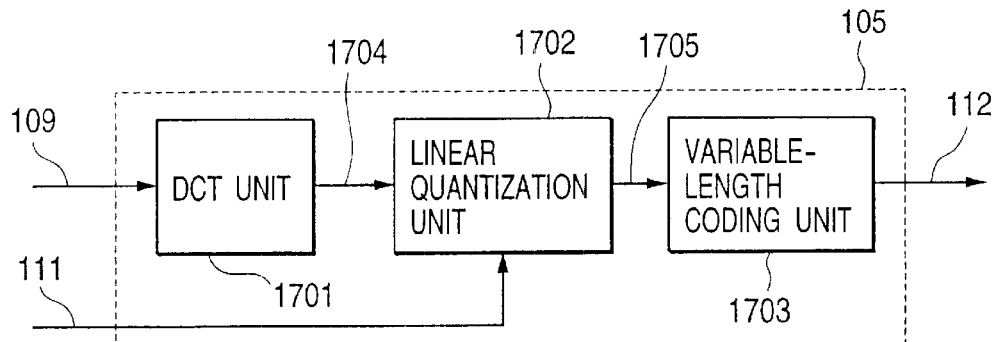
FIG. 17 is a block diagram of an image information coding unit used in the first embodiment.

In FIG. 17, the numeral 1701 denotes a DCT unit, numeral 1702 denotes a linear quantization unit, numeral 1703 denotes a variable-length coding unit, numeral 1704 denotes a DCT coefficient information, and numeral 1705 denotes a quantized DCT coefficient information.

Figure 18:
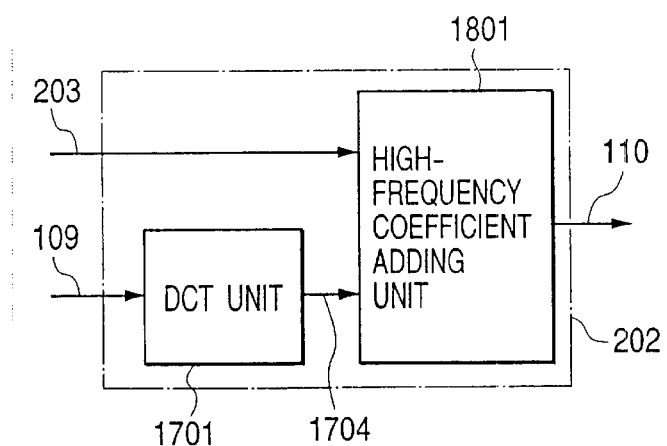
FIG. 18 is a block diagram of an image analysis value calculating unit used in the first embodiment.

In FIG. 18, the numeral 1801 denotes a high-frequency coefficient adding unit, and a DCT unit 1701 is the same as that included in the image information coding unit 105. The image analysis value calculating unit 202 need not have the image information coding unit 105, which, however, is included in the calculating unit for the convenience of explanation.

Figure 19:
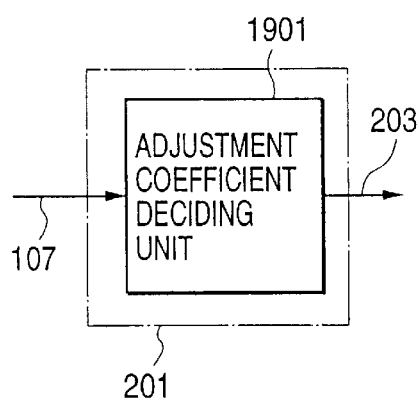
FIG. 19 is a block diagram of an analysis parameter deciding unit used in the first embodiment.

In FIG. 19, the numeral 1901 denotes an adjustment coefficient deciding unit.

Figure 20:
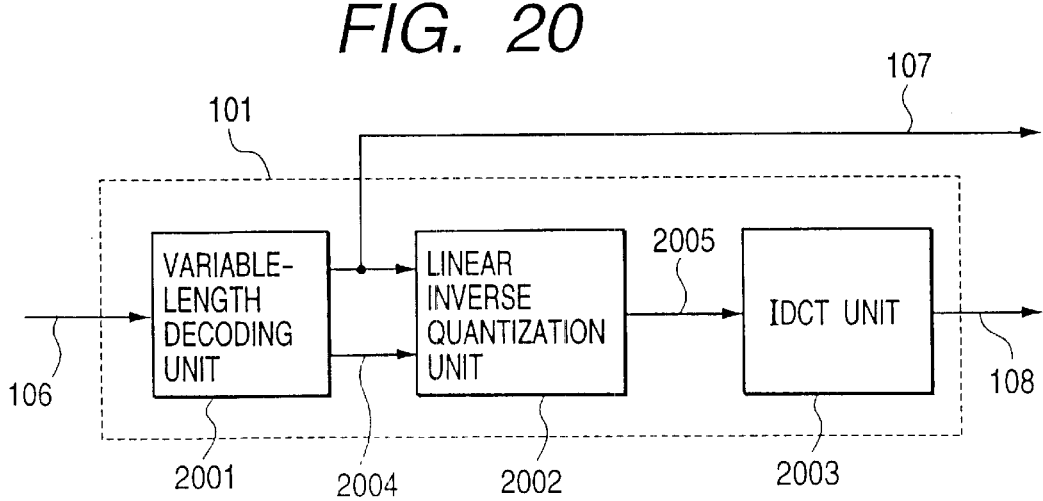
FIG. 20 is a block diagram of a coded image information decoding unit used in the first embodiment.

In FIG. 20, the numeral 2001 denotes a variable-length decoding unit, numeral 2002 denotes a linear inverse quantization unit, numeral 2003 denotes an IDCT unit, numeral 2004 denotes quantized DCT coefficient information, and numeral 305 denotes DCT coefficient information.

Figures 21, 22:
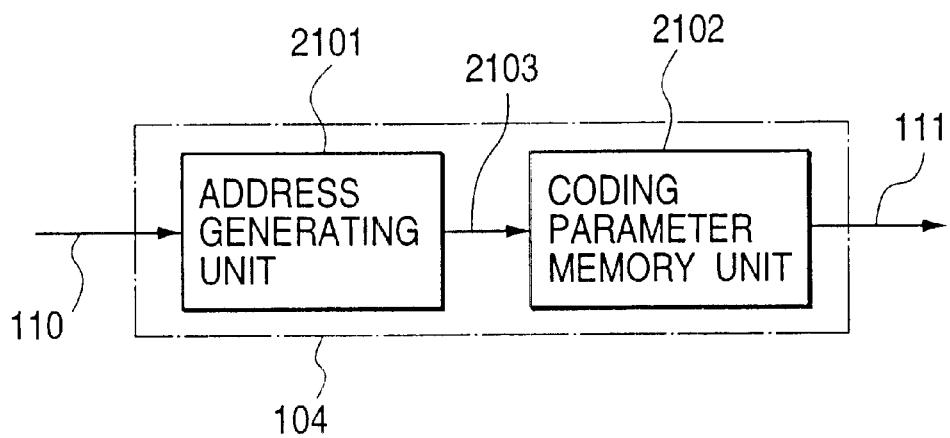
FIG. 21 is a block diagram of a coding parameter control unit used in the first embodiment.
FIG. 22 is an explanatory diagram of DCT coefficient information.

In FIG. 21, the numeral 2101 denotes an address generating unit, numeral 2102 denotes a coding parameter memory unit, and numeral 2103 denotes address information.

The operation of the image information coding unit 105 shown in FIG. 17 will be described first. In the DCT unit 1701, DCT is performed for the divided image information 109, and then the DCT coefficient information 1704 is outputted. The DCT coefficient information 1704 comprises such 64 transform coefficients ($c_0, c_1, \ldots c_{63}$) as shown in FIG. 22.

Using the 64 quantization matrices ($q_0, q_1, \ldots q_{63}$), the linear quantization unit 1702 quantizes the above 64 DCT coefficients and outputs the quantized DCT coefficient information 1705. In the quantization matrices, the numerical value $q_i$ represents the spacing of quantization (quantizing step size) with respect to each of the 64 transform coefficient. As to the transform coefficients ($c_0, c_1, \ldots c_{63}$), $c_0$ represents a coefficient of a DC component and the others represent coefficients of AC components. The larger the subscript number is, the higher is the frequency of the component represented by the coefficient concerned. A natural image such as a photograph is characteristic in that the number of high-frequency components is small. Usually, therefore, the quantizing step size in the high frequency region is enlarged to enhance the compression efficiency. The input coding parameter 111 inputted to the linear quantization unit is a numerical value called scaling factor (SF) in the JPEG method. The numerical values of the above quantization matrices are multiplied by SF to control the roughness of quantization. The larger the SF is, the higher the compression rate is and easier the occurrence of image quality degradation is.

In the variable-length coding unit 1703, the quantized DCT coefficient information 1705 is subjected to variable-length coding and the coded image information 112 is outputted.

Next, the operation of the coded image information decoding unit 101 shown in FIG. 20 will now be described. In the variable-length decoding unit 2001, the inputted, pre-stage coded image information 106 is subjected to variable-length decoding and the quantized DCT coefficient information 2004 is outputted. In the linear inverse quantization unit 2002, inverse quantization of the DCT coefficients is performed and the DCT coefficient information 2005 is outputted. In the IDCT unit 2003, inverse DCT transform is performed and the decoded image information 108 is outputted. The coding parameter 111 inputted to the linear quantization unit 1702 is an SF which is outputted from the variable-length decoding unit 2001.

Now, with reference to FIGS. 18 and 19, the operation of the image information analyzing unit 103 will be described. In a high-frequency coefficient adding unit 1801, the sum of absolute values of high-frequency coefficients contained in the DCT coefficient information 1704 is calculated and is outputted as the image quality control information 110. The high-frequency DCT coefficients indicate coefficients $c_i$ which satisfy the relationship of $i \geq N$ (N is a positive integer not larger than 63). That the absolute value sum of the high-frequency transform coefficients is large means that many edge components are contained in the image to be coded. If such an image is coded with a large SF, an image quality degradation such as mosquito noise will occur in the vicinity of edge portions.

In the adjustment coefficient deciding unit 1901, a coefficient for adjusting the processing in the high-frequency coefficient adding unit 1801 is decided by utilizing the code attribute information 107, namely the SF which has been used at the time of coding of the pre-stage coded image information 106. This is because there sometimes occurs the case where, as shown in FIG. 23, such coefficients as in FIG. 23A in initial coding become such coefficients as in FIG. 23B with most of high-frequency components lost, at the time of recording. More meansicularly, in the case where a divided image information 113 is decoded image information, if a high-frequency coefficient is added as it is thereto, the image in question may be analyzed to be an image entirely different (free of any edge component) in characteristics from the original image. To avoid this inconvenience, at the time of addition of a high-frequency coefficient, a coefficient for weighting a high-frequency component is determined in accordance with the SF and quantization coefficient used in the coding of the coded image information and is outputted as the analysis parameter 203.

The operation of the coding parameter control unit 104 shown in FIG. 21 will now be described. In the address generating unit 2101, address information 2103 for reading out an appropriate coding parameter from the coding parameter memory unit 2102 is generated. At this time, the larger is the image quality control information 110, that is, the larger is the addition result value of high-frequency components, the smaller SF address is generated, while the smaller the addition result value is, the larger SF address is generated. In the coding parameter memory unit 2102, the coding parameter stored in the address indicated by the address information 2103 is read out and is outputted as the coding parameter 111.

Then, when coded image information is inputted, then is once decoded and is thereafter coded again, the decoded image quality can be controlled more exactly by making reference to the coding parameter contained in the coded image information.

Although in this embodiment both the coded image information decoding unit 101 and the image information coding unit 105 are based on the same coding method, they can be implemented even without being based on the same method.

Second Embodiment

Figure 3:
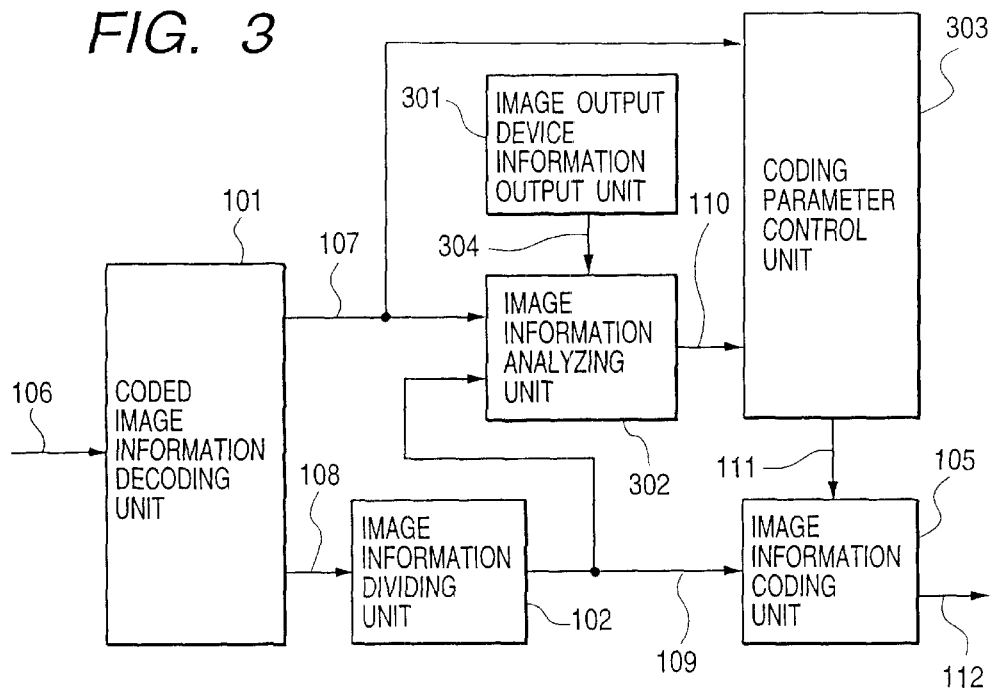
FIG. 3 is a schematic block diagram of an image information coding system according to the second embodiment of the present invention.

FIG. 3 is a block diagram showing an image information coding system according to the second embodiment of the present invention. In the same figure, the numeral 301 denotes an image output device information output unit, numeral 302 denotes an image analyzing unit, numeral 303 denotes a coding parameter control unit, and numeral 304 denotes image output device information. Other constructional points are the same as in the first embodiment.

This second embodiment is different from the previous first embodiment in that the image output device information 304 is utilized at the time of making an analysis for each image quality degradation item in the image analyzing unit 302 and calculating the image quality information 110 and also in that the code attribute information 107 is utilized at the time of deciding the coding parameter 111 in the coding parameter control unit 303.

Regarding the portions different from the first embodiment, their schematic configurations and operations will be described below.

The image output device characteristic output unit 301 outputs, as the image output device information 304, output device characteristic information which exerts an influence on how the image quality degradation is detected. As examples of the image output device information 304, there are mentioned an effective gradation number, resolution and sharpness of the image output device.

Figure 4:
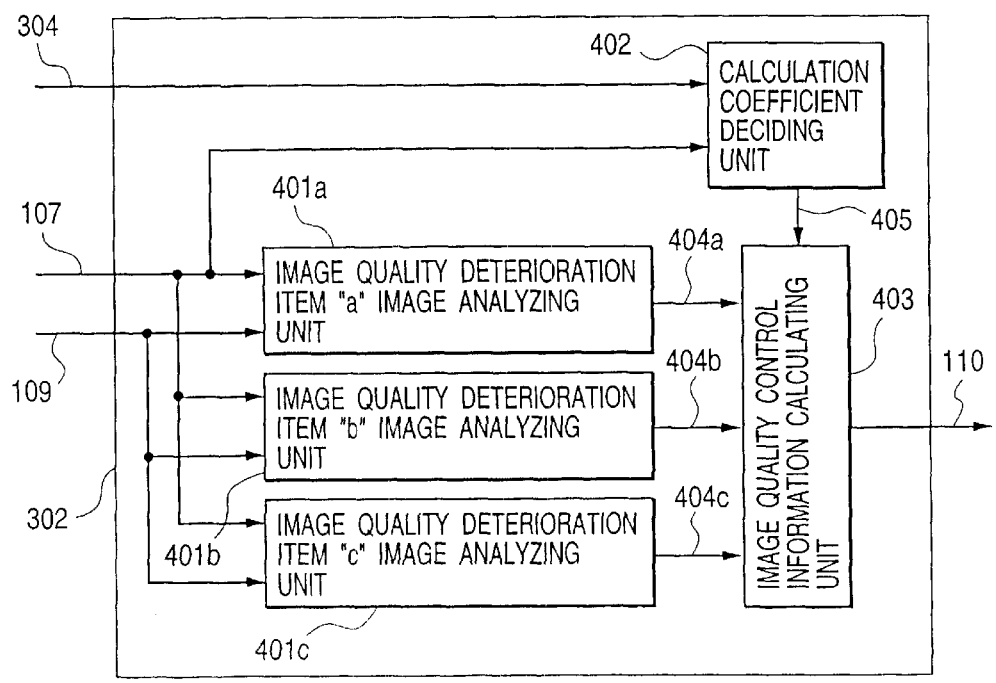
FIG. 4 is a schematic block diagram of an image information analyzing unit used in the second embodiment.

FIG. 4 is a block diagram showing the configuration of the image analyzing unit 302 used in this embodiment. In the same figure, the numerals 401a, 401b and 401c denote image quality degradation item-by-item image analyzing units, numeral 402 denotes a calculation coefficient deciding unit, numeral 403 denotes an image quality control information calculating unit, numeral 404 denotes image quality degradation item-by-item image analysis information, and numeral 405 denotes a calculation coefficient. The image quality degradation item represents the item of a coding distortion which may occur in the image information coding unit 105. In this embodiment it is assumed that the image quality degradation item comprises item "a" (blur), item "b" (pseudo contour), and item "c" (mosquito noise).

The operation of the image analyzing unit 302 will now be described schematically with reference to FIG. 4. In the image quality degradation item "a" image analyzing unit 401a, a check is made to see whether the divided image information 109 is apt to cause the image quality degradation item "a" by coding, and the result thereof is outputted as image quality degradation item-by-item image analysis information 404a. At this time, the code attribute information 107 is utilized for the analysis. Likewise, in the image quality degradation item "b" image analyzing unit 401b and the image quality degradation item "c" image analyzing unit 401c, a check is made in the same manner as above and the results thereof are outputted as image quality degradation item "b" image analysis information 404b and image quality degradation item "c" image analysis information 404c. In the image quality control information calculating unit 403, image quality control information 110 is calculated from the image quality degradation item-by-item image analysis information 404 and is outputted.

Figure 5:
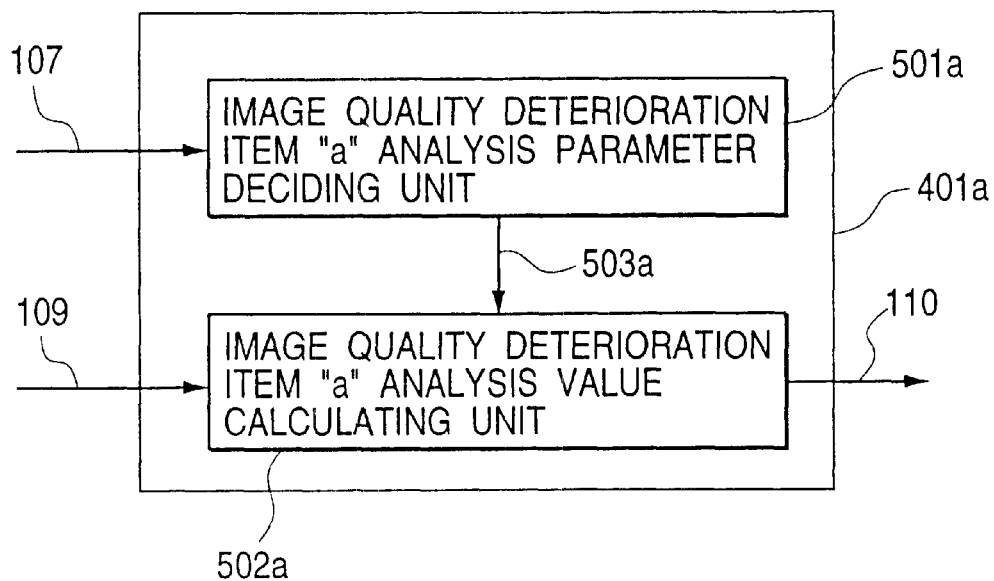
FIG. 5 is a schematic block diagram of an image quality degradation item-by-item image information analyzing unit used in the second embodiment.

FIG. 5 shows the configuration of the image quality degradation item "a" image analyzing unit 401a. In the same figure, the numeral 501a denotes an image quality degradation item "a" analysis parameter deciding unit, numeral 502a denotes an image quality degradation item "a" analysis value calculating unit, and numeral 503a denotes an image quality degradation item "a" analysis parameter. The other image quality degradation items are also of the same configurations.

The operation of the image quality degradation item "a" image analyzing unit 401a will now be described schematically with reference to FIG. 5. Using the code attribute information 107, the image quality degradation item "a" analysis parameter deciding unit 501a decides an analysis parameter and outputs it as the image quality degradation item "a" analysis parameter 503a. Then, using the image quality degradation item "a" analysis parameter 503a, the image quality degradation item "a" analysis value calculating unit 502a analyzes the divided image information 109 and outputs the image quality degradation item "a" image analysis information 404a.

Figure 6:
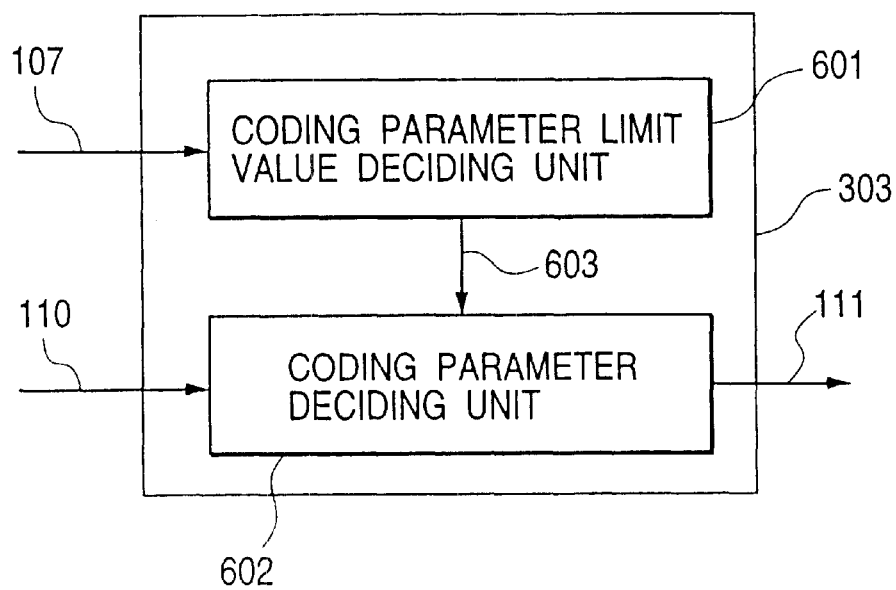
FIG. 6 is a schematic block diagram of a coding parameter control unit used in the second embodiment.

FIG. 6 shows the configuration of the coding parameter control unit 303 used in this embodiment. In the same figure, the numeral 601 denotes a coding parameter limit value deciding unit, numeral 602 denotes a coding parameter deciding unit, and numeral 603 denotes a coding parameter limit value.

The operation of the coding parameter control unit 303 will now be described schematically with reference to FIG. 6. Using the code attribute information 107, the coding parameter limit value deciding unit 601 decides the coding parameter limit value 603 and outputs it. The coding parameter deciding unit 602 decides the coding parameter 111 so as not to exceed the coding parameter limit value 603 and outputs it.

Figure 24:
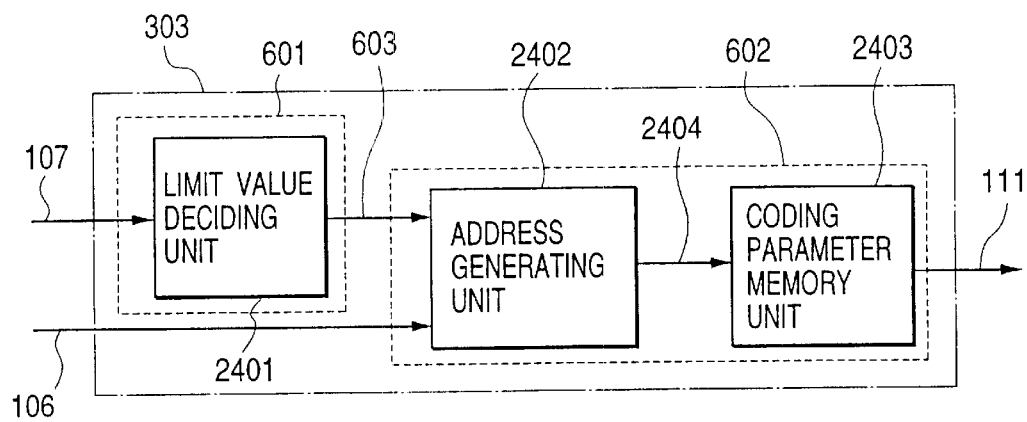
FIG. 24 is a block diagram of a coding parameter control unit used in the second embodiment.
Figure 26:
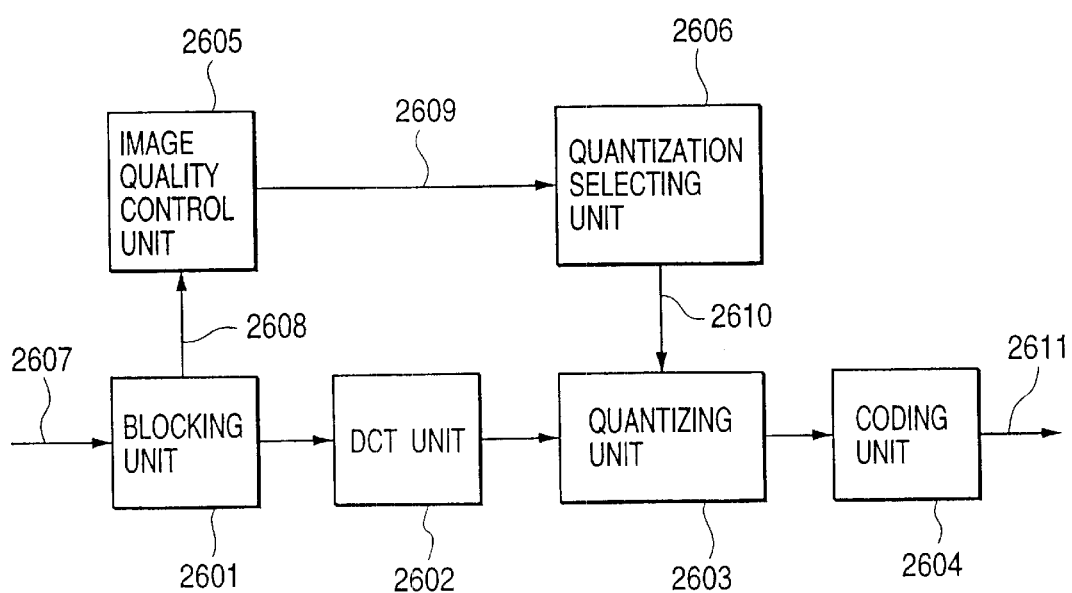
FIG. 26 is a schematic block diagram of a conventional coding system having an image quality control function.
Figure 25A:
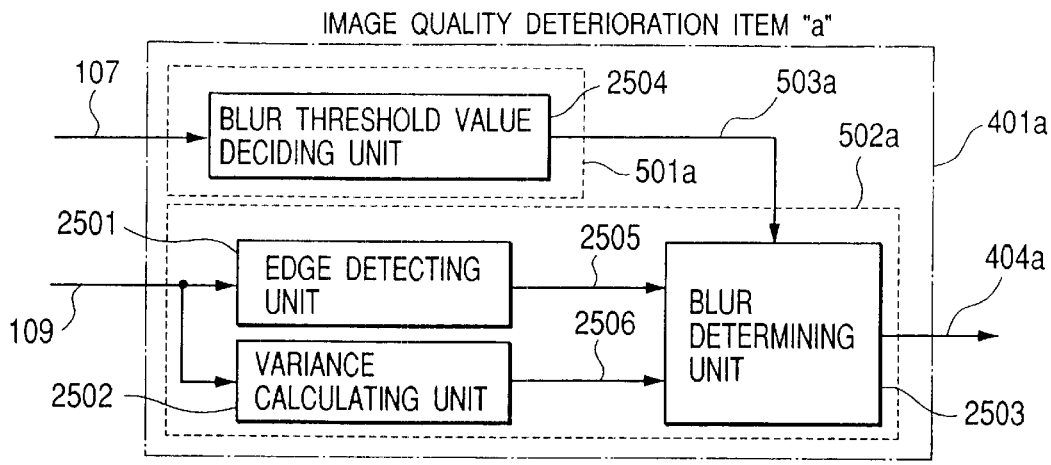
FIGS. 25A–25C are block diagrams of an image quality degradation item-by-item image analyzing unit used in the second embodiment.
Figure 25B:
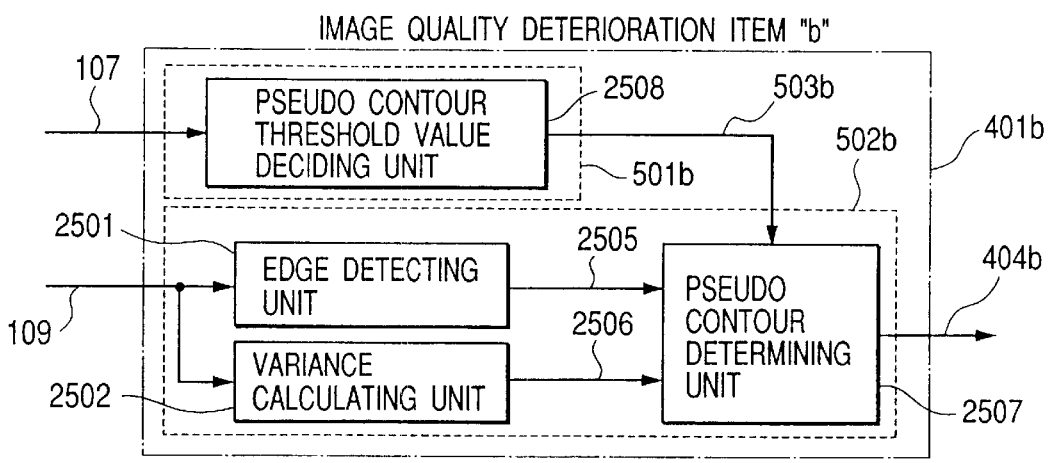
Figure 25C:
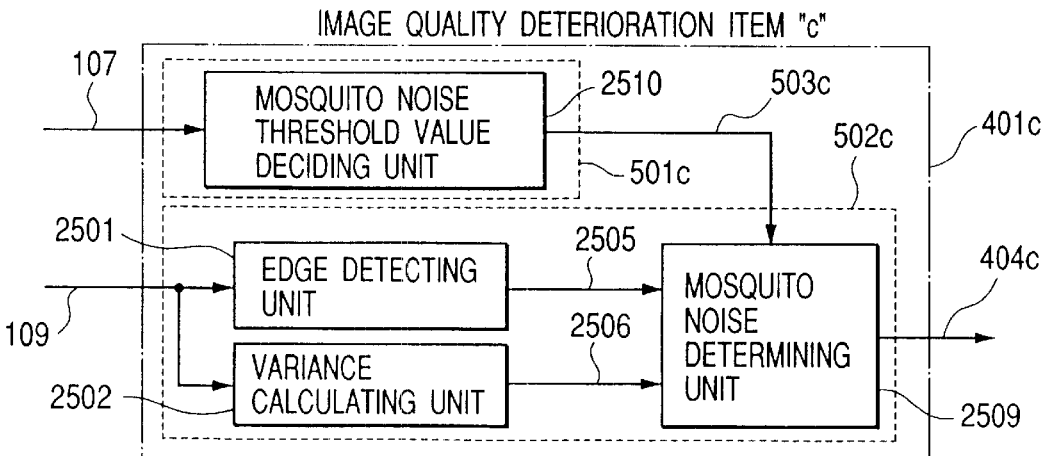
Figure 28:
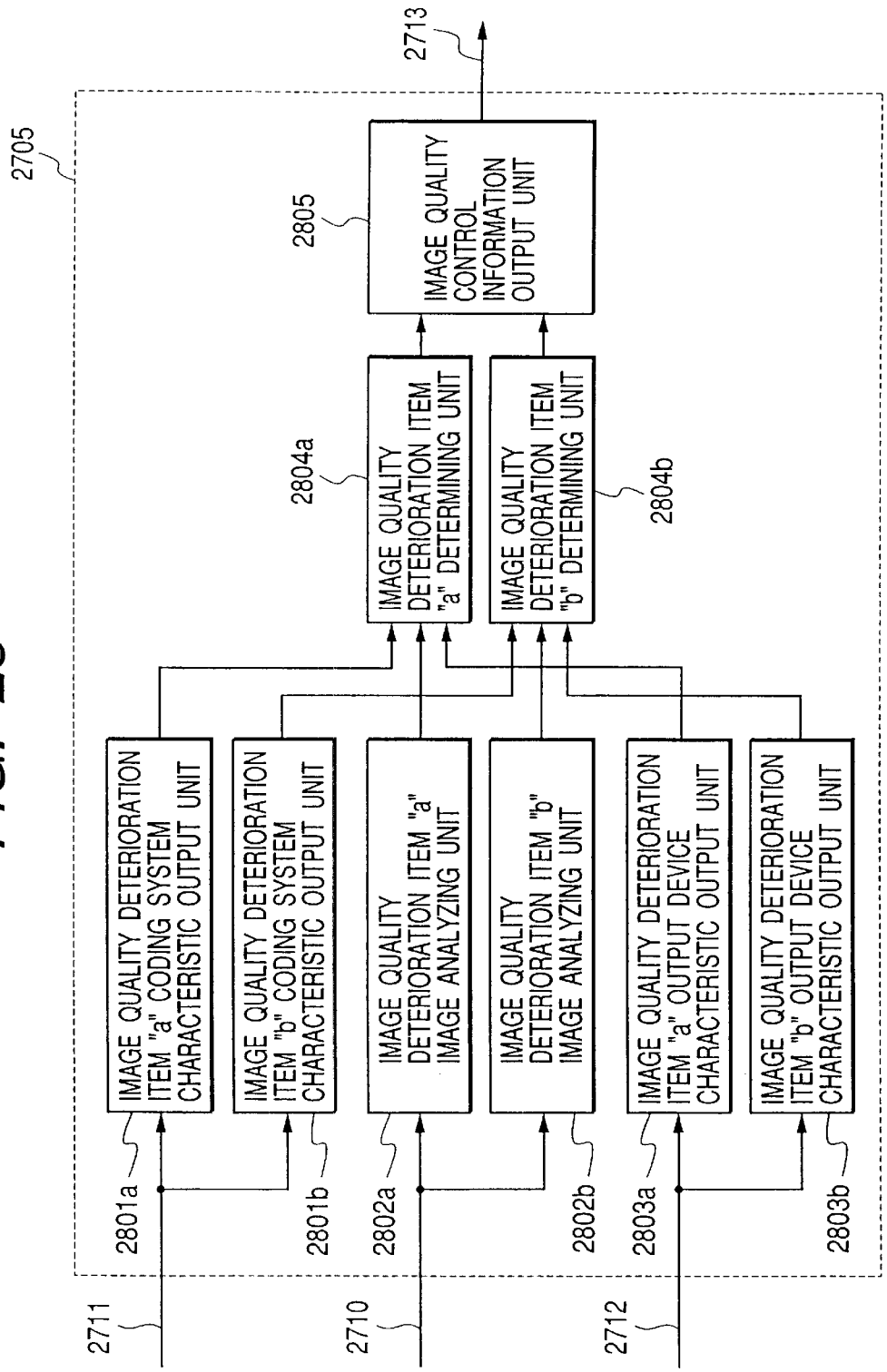
FIG. 28 is a block diagram of an image quality control unit used in the conventional coding system shown in FIG. 27.

The configuration and operation of this embodiment will now be described more concretely. A configuration example of the coding parameter control unit 303 and that of the image quality degradation item-by-item image analyzing unit 401 both used in this embodiment are shown in FIGS. 24 and 25, respectively. In this embodiment, three items are handled as image quality degradation items, which are item "a" (blur), item "b" (pseudo contour), and item "c" (mosquito noise).

In FIG. 24, the numeral 2401 denotes a limit value deciding unit, numeral 2402 denotes an address generating unit, numeral 2403 denotes a coding parameter memory unit, and numeral 2404 denotes address information.

A description will now be given of the operation. In the limit value deciding unit 2401, a limit value of the coding parameter 111, i.e., a maximum value of SF, which is assumed to be $SF_{max}$, is decided so as to satisfy the following condition (a) by utilizing the code attribute information 107, i.e., the SF which has been used in the coding of the pre-stage coded image information 106, the SF being assumed to be $SF_{old}$:

(a) If $SF_{old} \geq Th_0$ then $SF_{max}=SF_0$ else if $Th_{i-1} \leq SF_{old} \leq Th_i$ then $SF_{max}=SF_i$     [Expression 1]

(i=1, 2, ..., M) (M is a positive integer.)

In the case of recording a decoded image, setting the coding parameter larger than a predetermined value may result in extreme degradation of image quality. (The description given herein is based on the assumption that the image quality is degraded if the coding parameter is set large.) As to what coding parameter it is that causes extreme degradation of image quality, it depends on the coding parameter used in the preparation of coded image information. In FIG.

25, the numeral 2501 denotes an edge detecting unit, numeral 2502 denotes a variance calculating unit, numeral 2503 denotes a blur determining unit, numeral 2504 denotes a blur threshold value deciding unit, numeral 2505 denotes image edge information, numeral 2506 denotes image variance information, numeral 2507 denotes a pseudo contour determining unit, numeral 2508 denotes a pseudo contour threshold value deciding unit, numeral 2509 denotes a mosquito noise determining unit, and numeral 2510 denotes a mosquito noise threshold value deciding unit. The edge detecting unit 2501 and the variance calculating unit 2502 need not be provided separately as in the figure.

Reference will now be made to the operation. In a blur image analysis value calculating unit 502a, the edge detecting unit 2501 detects an edge contained in the divided image information and outputs the image edge information 2505. The edge detection is performed by template matching. The larger the output result is, the stronger edge is detected. Such an edge detection processing is carried out for each pixel in the divided image information, and whether or not the degradation in image quality of the divided image information is apt to occur is analyzed on the basis of whether the number of edge-detected pixels is large or not or whether or not the detected edges are strong. The variance calculating unit 2502 calculates the variance of the divided image information and outputs the image variance information 2506. The blur determining unit 2503 digitizes the easiness of blur occurrence from the number of pixels in the divided image information 109 with the edge degree $E_i$ (i=0.1, ..., 63) exceeding a predetermined threshold value, Thedge1, and also from the maximum value $E_{max}$ of the edge degree $E_i$, and outputs the result as the blur image analysis information 404a. Thus, the larger the number of pixels with the edge degree exceeding the threshold value and the larger the maximum value of the edge degree, the easier is determined the occurrence of blur. The blur threshold value deciding unit 2504 decides a threshold value, Thedge, in accordance with the code attribute information 107, i.e., the value of SF and outputs it. This is because strong edges may have been lost by coding in the case of a decoded image.

The three types of image quality degradation item-by-item image analyses are all performed on the basis of both the image edge information 2505 and the image variance information 2506.

In a pseudo contour image analysis value calculating unit 502b, the pseudo contour determining unit 2507 digitizes the easiness of occurrence of a pseudo contour from the number of pixels with the edge degree $E_i$ smaller than a predetermined threshold value, Thedge2, and also from a variance value S of the divided image information 109 which value is represented by the image variance information 2506, and outputs the result as the pseudo contour image analysis information 404b. Thus, the larger the number of pixels with the edge degree smaller than the predetermined threshold value and the smaller the variance value, the easier is determined the occurrence of a pseudo contour. The pseudo contour threshold value deciding unit 2508 changes a threshold value, Tsigma1, which is for determining the magnitude of the variance value, in accordance with the code attribute information 107, i.e., the value of SF. This is because in the case of a decoded image a certain SF value may result in the variance value becoming larger than in the original image, and therefore it is intended to prevent wrong determination.

In a mosquito noise image analysis value calculating unit 502c, the mosquito noise determining unit 2509 digitizes the easiness of occurrence of mosquito noise from the number of pixels with the edge degree $E_i$ larger than a predetermined threshold value, Thedge3, also from the maximum value $E_{max}$ of the edge degree $E_i$ in this condition, and further from a variance value S of the divided image information 109 which value is represented by the image variance information 2509, and outputs the result as the mosquito noise image analysis information 404c. Thus, the larger the number of pixels with the edge degree larger than the predetermined threshold value and the larger the maximum value of the edge degree and the smaller the variance value, the easier is determined the occurrence of mosquito noise. Like the blur threshold value deciding unit 2504 and the pseudo contour threshold value deciding unit 2508, the mosquito noise threshold value deciding unit 2510 adjusts Thedge3 and a threshold value, Tsigma2, which is for determining the magnitude of the variance value, in accordance with the value of SF.

The image quality control information calculating unit 403 shown in FIG. 4 performs weighting processing and outputs the image quality control information 110.

$$D=Xa*Da+Xb*Db+Xc*Dc \qquad \text{[Expression 2]}$$

where D is the image analysis information 110, Da is the blur image analysis information 404a, Db is the pseudo contour image analysis information 404b, Dc is the mosquito noise image analysis information 404c, and Xa, Xb and Xc are weighting coefficients.

This weighting processing is carried out for the following reason.

In the case where plural types of image quality degradation occur in the image information coding unit 105, the easiness of detecting an image quality degradation varies depending on their interaction. In more meansicular terms, an image quality degradation which alone is enough for detection by the human eyes may become difficult to be detected if it occurs together with other image quality degradation items. Therefore, in the case of a coding method wherein plural types of image degradation occur at a time, weighting processing is performed for the image quality degradation item-by-item image analysis information, thereby outputting more exact image quality control information 110. For example, when both blur and mosquito noise occur simultaneously and are more difficult to be detected than in the occurrence of blur alone, the weighting coefficient Xa for blur is set small.

Utilizing the code attribute information 107 and the image output device characteristic information 304, the calculation coefficient deciding unit 402 decides the foregoing weighting coefficients and outputs it.

For example, if the code attribute information 107 contains a coding method and a coding parameter both used in the previous stage and if the occurrence of blur in the divided image information 109 can be predicted, the weighting coefficient Xa is set small for diminishing the influence of blur among the image quality degradation which occur in the image information coding unit 105.

If the image output device information 304 contains an effective gradation number, resolution and sharpness of the image output device and if the occurrence of pseudo contour or mosquito noise in the divided image information 109 can be predicted, the higher is the effective gradation number, the larger are set the weighting coefficients Xb and Xc for the pseudo contour and the mosquito noise. If the occurrence of blur in the divided image information 109 can be predicted, then the lower the resolution is or the lower the sharpness is, the smaller is set the weighting coefficient Xa of blur.

Thus, by determining calculation coefficient information 702 with use of the code attribute information 107 and the image output device information 304, it becomes possible to output more exact image quality control information 110.

Third Embodiment

Figure 7:
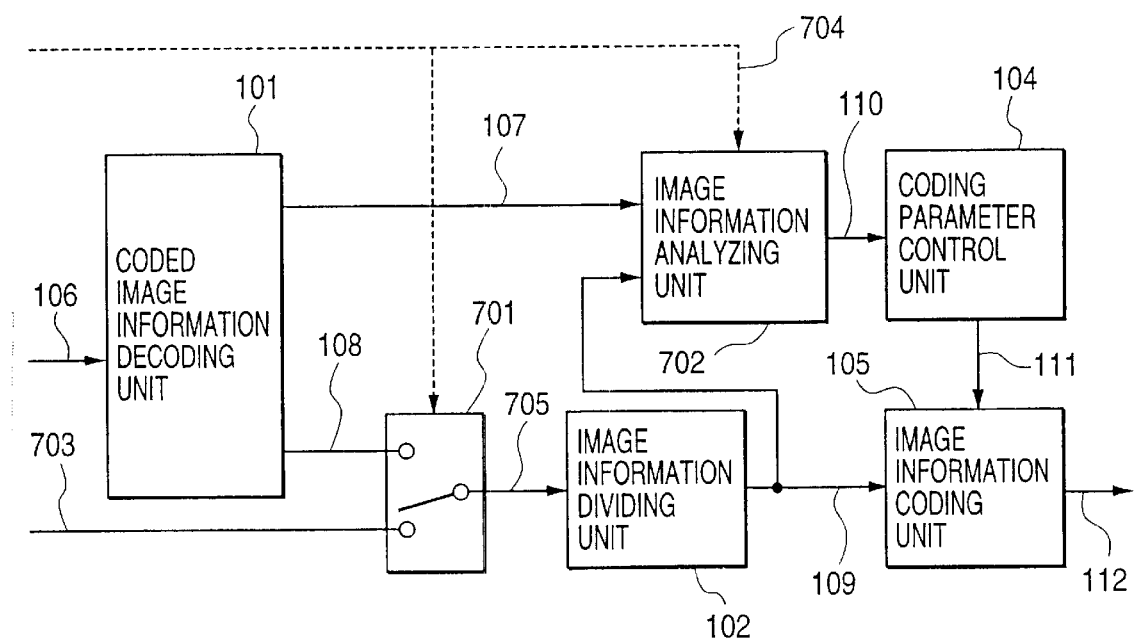
FIG. 7 is a schematic block diagram of an image information coding system according to the third embodiment of the present invention.

FIG. 7 is a block diagram showing an image information coding system according to the third embodiment of the present invention. In the same figure, the numeral 701 denotes an image information selecting unit, numeral 702 denotes an image analyzing unit, numeral 703 denotes non-coded image information, numeral 704 denotes change-over information, and numeral 705 denotes selected image information. Other constructional points are the same as in the first embodiment.

This third embodiment is different from the first embodiment in that not only the decoded image information 108 obtained by decoding the coded image information 106 but also the non-coded image information 703 can be handled. Different portions from the first embodiment will be described below with respect to their schematic configurations and operations.

In accordance with the change-over information 704 the image information selecting unit 701 selects either the decoded image information 108 or the non-coded image information 703 and outputs the selected information as the selected image information 705.

Figure 8:
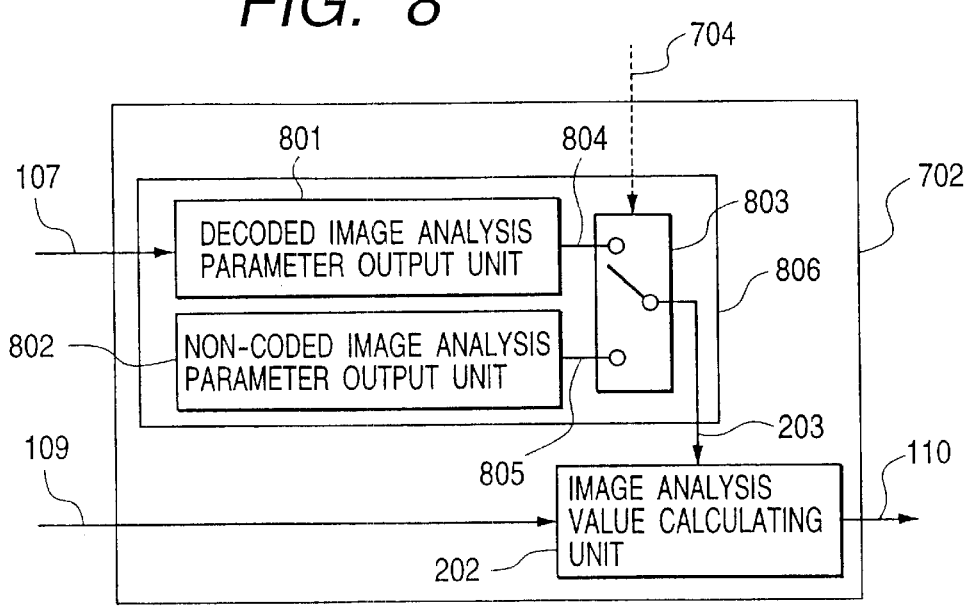
FIG. 8 is a schematic block diagram of an image information analyzing unit used in the third embodiment.

FIG. 8 is a block diagram showing the configuration of the image analyzing unit 702 used in this embodiment. In the same figure, the numeral 801 denotes a decoded image analysis parameter output unit, numeral 802 denotes a non-coded image analysis parameter output unit, numeral 803 denotes an analysis parameter selecting unit, numeral 804 denotes a decoded image analysis parameter, numeral 805 denotes a non-coded image analysis parameter, and numeral 806 denotes an analysis parameter deciding unit.

The operation of the image analyzing unit 702 will be described below schematically with reference to FIG. 8.

In the analysis parameter deciding unit 806, the decoded image analysis parameter output unit 801 decides the decoded image analysis parameter 804 by utilizing the code attribute information 107 and outputs it. The configuration and operation of the decoded image analysis parameter output unit 801 are the same as those of the analysis parameter deciding unit 201. The non-coded image analysis parameter output unit 802 outputs the non-coded image analysis parameter 805 of a predetermined value. In accordance with the change-over information 704, the analysis parameter selecting unit 803 selects either the decoded image analysis parameter 804 or the non-coded image analysis parameter 805 and outputs the selected parameter as the analysis parameter 203.

Using the analysis parameter 203, the image analysis value calculating unit 202 calculates a statistic of the divided image information 109.

The operations of the associated portions in the case of the decoded image information 108 being selected by the change-over information 704 are the same as in the first embodiment. When the non-coded image information 703 is selected, the image analysis value calculating unit 202 makes an image analysis using a fixed analysis parameter.

Fourth Embodiment

Figure 9:
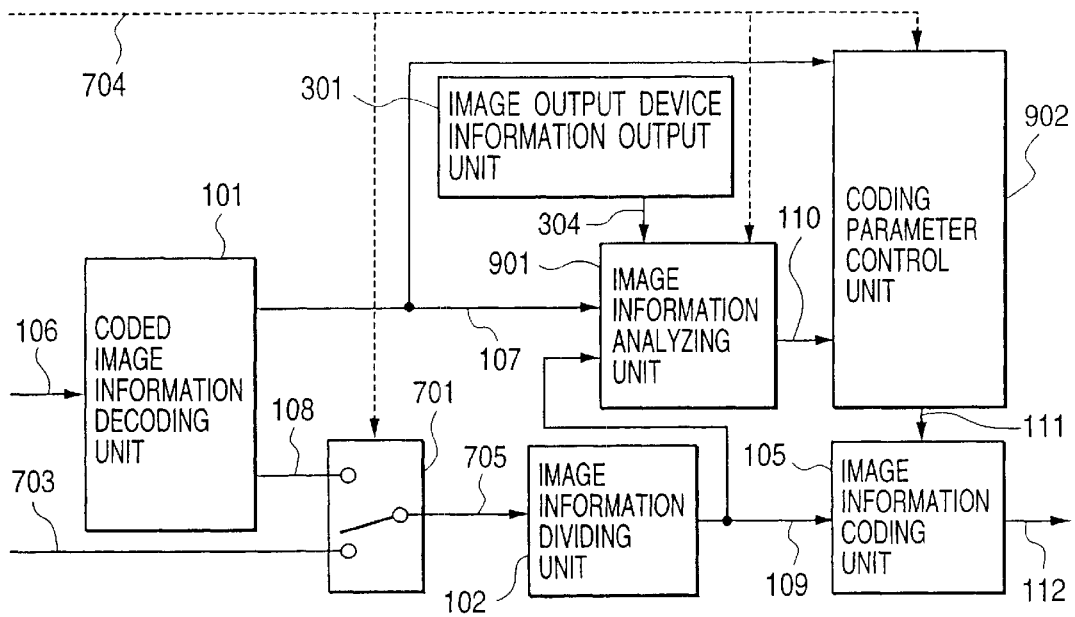
FIG. 9 is a schematic block diagram of an image information coding system according to a fourth embodiment of the present invention.

FIG. 9 is a block diagram showing an image information coding system according to the fourth embodiment of the present invention. In the same figure, the numeral 901 denotes an image information analyzing unit and numeral 902 denotes a coding parameter control unit. The image information selecting unit 701 used in this embodiment is the same as in the third embodiment. And other constructional points are the same as in the second embodiment.

The image information analyzing unit 901 and the coding parameter control unit 902, which are different from the second and third embodiments, will be described below with respect to their schematic configurations and operations.

Figure 10:
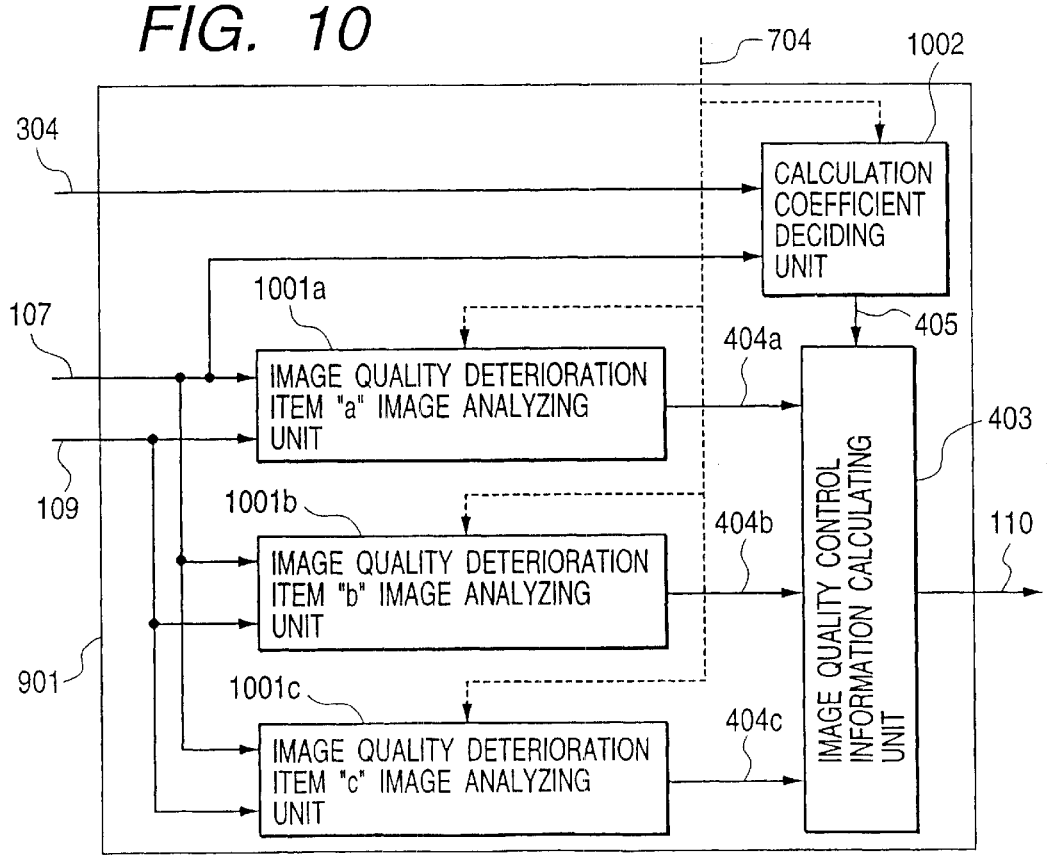
FIG. 10 is a schematic block diagram of an image information analyzing unit used in the fourth embodiment.

FIG. 10 is a block diagram showing the configuration of the image analyzing unit 901 used in this embodiment. In the same figure, the numerals 1001a, 1001b and 1001c denote image quality degradation item-by-item image analyzing units and numeral 1002 denotes a calculation coefficient deciding unit. The configuration of the image quality degradation item "a" image analyzing unit 1001a and that of the calculation coefficient deciding unit 1002 are shown in FIGS. 11 and 12, respectively.

Figure 11:
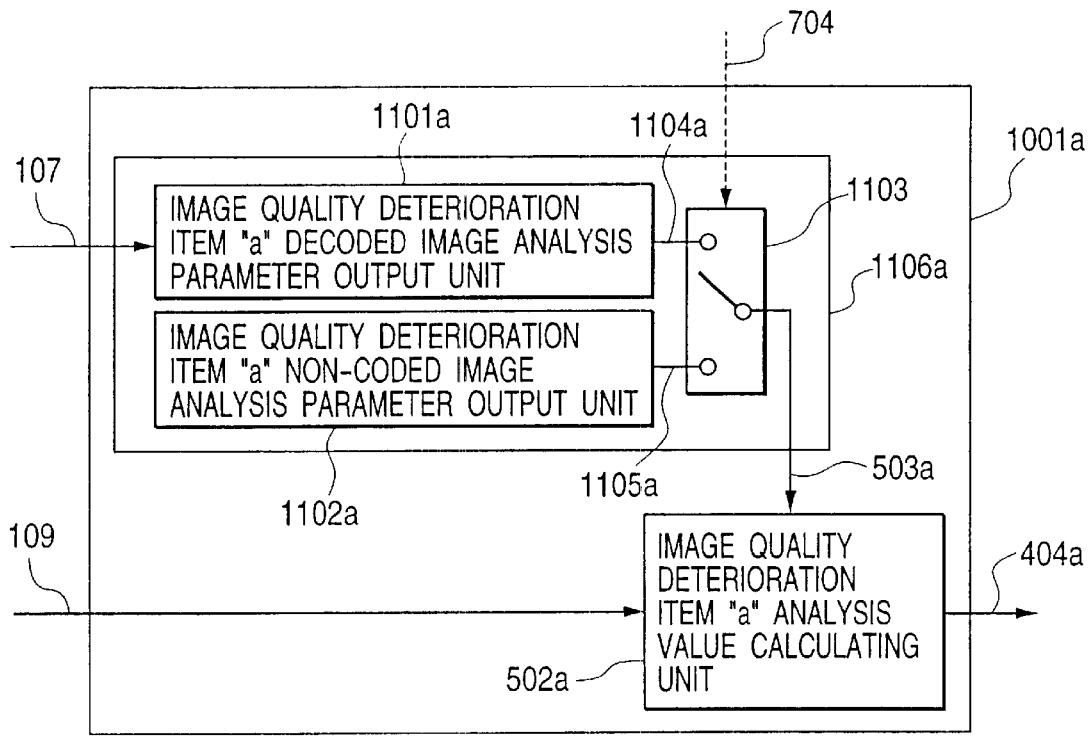
FIG. 11 is a schematic block diagram of an image quality degradation item-by-item image information analyzing unit used in the fourth embodiment.
Figure 12:
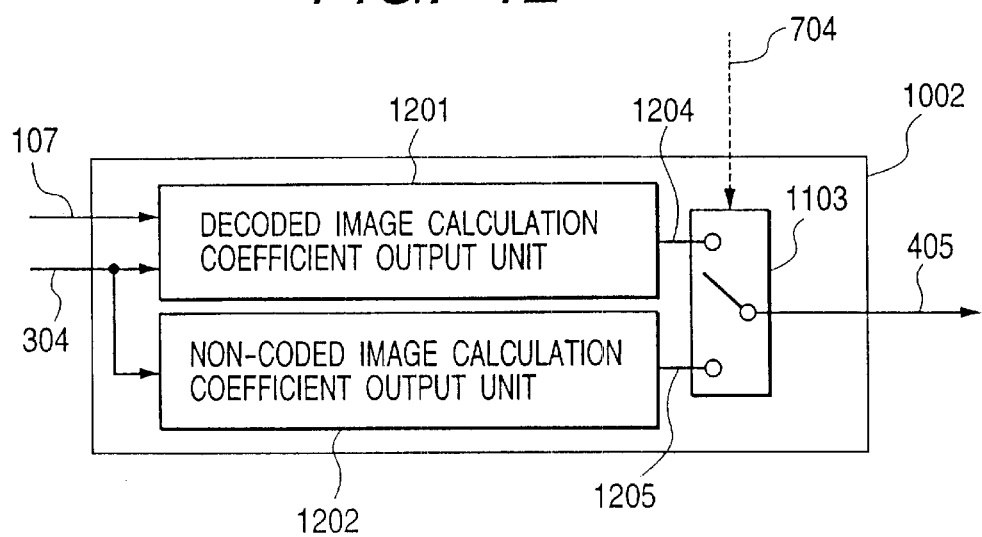
FIG. 12 is a schematic block diagram of a calculation coefficient deciding unit used in the fourth embodiment.

In FIG. 11, the numeral 1101a denotes an image quality item "a" decoded image analysis parameter output unit, numeral 1102a denotes an image quality degradation item "a" non-coded image analysis parameter output unit, numeral 1103 denotes an analysis parameter selecting unit, numeral 1104a denotes an image quality degradation item "a" decoded image analysis parameter, numeral 1105a denotes an image quality degradation item "a" non-coded image analysis parameter, and numeral 1106a denotes an image quality item "a" analysis parameter deciding unit.

The operation of the image quality degradation item-by-item image analyzing unit 1001a will be described below schematically with reference to FIG. 11.

In the image quality degradation item "a" analysis parameter deciding unit 1106a, the decoded image analysis parameter output unit 1101a decides the image quality degradation item "a" decoded image analysis parameter 1104a by utilizing the code attribute information 107 and outputs it and outputs it. The configuration and operation of the image quality degradation item "a" decoded image analysis parameter output unit 1101a are the same as those of the image quality degradation item "a" analysis parameter deciding unit 501a. The image quality degradation item "a" non-coded image analysis parameter output unit 1102a outputs the image quality degradation item "a" non-coded image analysis parameter 1105a of a predetermined value. In accordance with the change-over information 704, the analysis parameter selecting unit 1103 selects either the image quality item "a" decoded image analysis parameter 1104a or the image quality degradation item "a" non-coded image analysis parameter 1105a and outputs the selected parameter as the image quality degradation item "a" analysis parameter 503a.

Using the image quality degradation item "a" analysis parameter 503a, the image quality degradation item "a" image analysis value calculating unit 502a calculates a statistic of the divided image information 109.

In the case where the decoded image information 108 is selected in accordance with the change-over information 704, the operations of the associated portions are the same as in the second embodiment. When the non-coded image information 703 is selected, the image quality degradation item-by-item image analysis value calculating unit 502 makes an image analysis using a fixed analysis parameter.

The image quality degradation item "b" image analyzing unit 1001b and the image quality degradation item "c" image analyzing unit 1001c are also of the same configurations and operations as in FIG. 11.

In FIG. 12, the numeral 1201 denotes a decoded image calculation coefficient output unit, numeral 1202 denotes a non-coded image calculation coefficient output unit, numeral 1203 denotes a calculation coefficient selecting unit, numeral 1204 denotes a decoded image calculation coefficient, and numeral 1205 denotes a non-coded image calculation coefficient.

The operation of the calculation coefficient deciding unit 1002 will be described below schematically with reference to FIG. 12.

Using both code attribute information 107 and image output device information 304, the decoded image calculation coefficient output unit 1201 decides and outputs the decoded image calculation coefficient 1204. The configuration and operation of the decoded image calculation coefficient output unit 1201 are the same as those of the calculation coefficient deciding unit 402. Using the image output device information 304, the non-coded image calculation coefficient output unit 1202 decides and outputs the non-coded image calculation coefficient 1205. In accordance with the change-over information 704, the calculation coefficient selecting unit 1203 selects either the decoded image calculation coefficient 1204 or the non-coded image calculation coefficient 1205 and outputs the selected coefficient as the calculation coefficient 405.

In the case where the decoded image information 108 is selected in accordance with the change-over information 704, the associated portions operate in the same way as in the second embodiment. When the non-coded image information 703 is selected, the non-coded image calculation coefficient output unit 1202 outputs a calculation coefficient which is determined by the image output device information 304.

Figure 13:
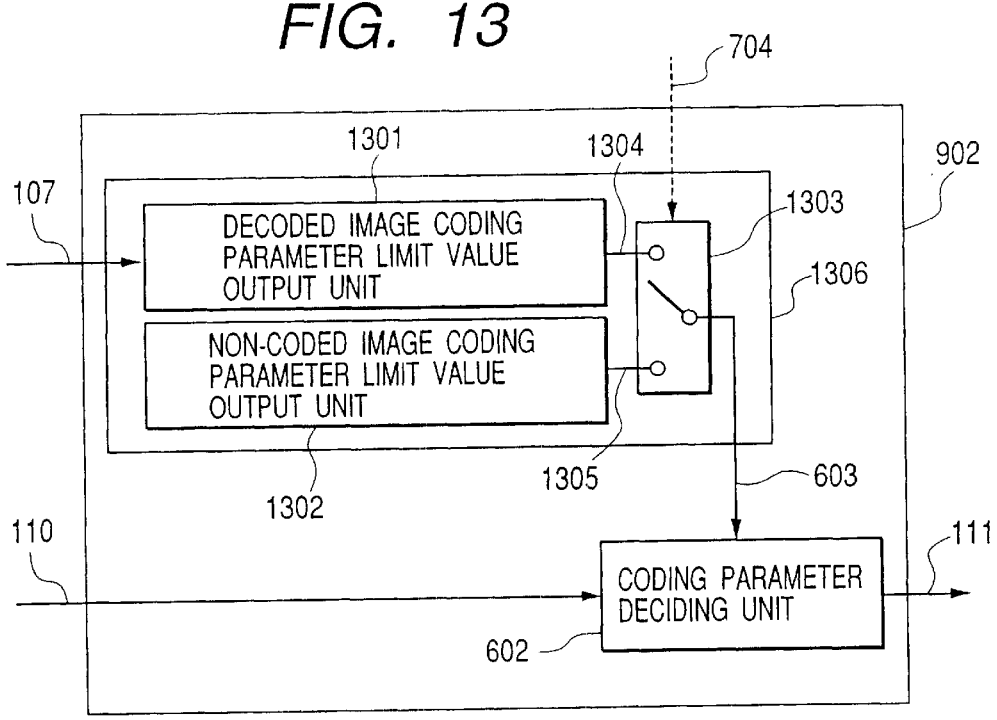
FIG. 13 is a schematic block diagram of a coding parameter control unit used in the fourth embodiment.

FIG. 13 is a block diagram showing the configuration of the coding parameter control unit 902 used in this embodiment. In the same figure, the numeral 1301 denotes a decoded image coding parameter limit value output unit, numeral 1302 denotes a non-coded image coding parameter limit value output unit, numeral 1303 denotes a coding parameter limit value selecting unit, numeral 1304 denotes a decoded image coding parameter limit value, numeral 1305 denotes a non-coded image coding parameter limit value, and numeral 1306 denotes a coding parameter limit value deciding unit.

The operation of the coding parameter control unit 902 will be described below schematically with reference to FIG. 13.

In the coding parameter limit value deciding unit 1306, the decoded image coding parameter limit value output unit 1301 decides the decoded image coding parameter limit value 1304 using the code attribute information 107 and outputs it. The configuration and operation of the decoded image coding parameter limit value output unit 1301 are the same as those of the coding parameter limit value deciding unit 601. The non-coded image coding parameter limit value output unit 1302 outputs the non-coded image coding parameter limit value 1305 which is a predetermined value. In accordance with the change-over information 704, the coding parameter limit value selecting unit 1303 selects either the decoded image coding parameter limit value 1304 or the non-coded image coding parameter limit value 1305 and outputs the selected limit value as the coding parameter limit value 603.

In the case where the decoded image information 108 is selected in accordance with the change-over information 704, the associated portions operate in the same manner as in the second embodiment. When the non-coded image information 703 is selected, the non-coded image coding parameter limit value output unit 1302 outputs a fixed coding parameter limit value.

Fifth Embodiment

Figure 14:
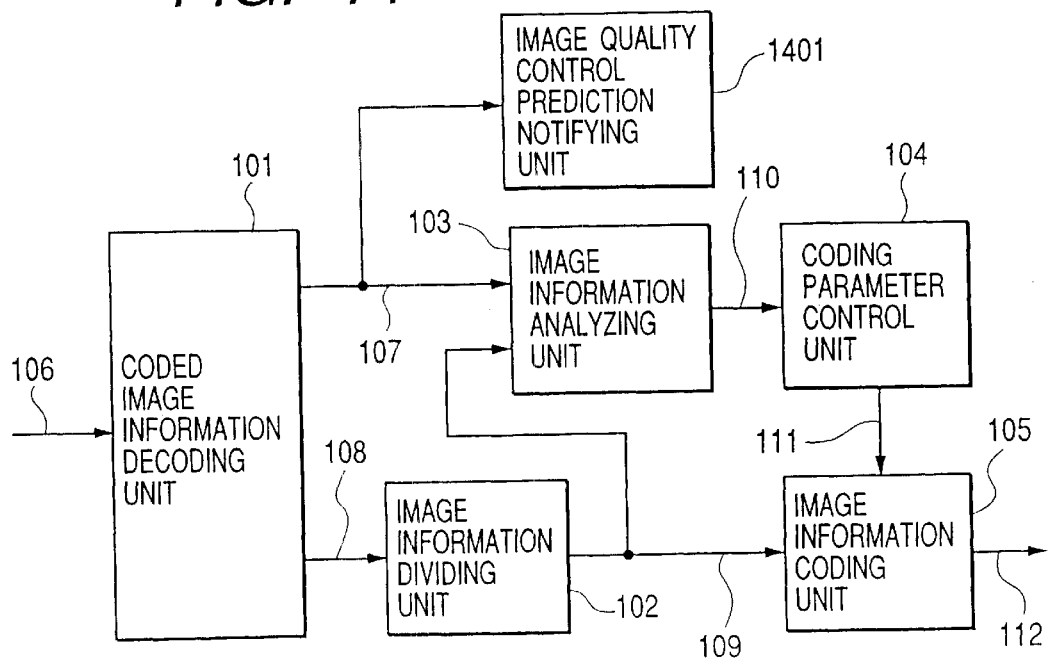
FIG. 14 is a schematic block diagram of an image information coding system according to the fifth embodiment of the present invention.

FIG. 14 is a block diagram showing an image information coding system according to the fifth embodiment of the present invention. This fifth embodiment is different from the first embodiment in that there is used a means that predicts whether an image quality control is proper or not and notifies the result of the prediction to the user and in that there is used a coded image information decoding unit capable of coping with a plurality of coding methods. In the same figure, the numeral 1401 denotes an image quality control prediction notifying unit.

Figure 15:
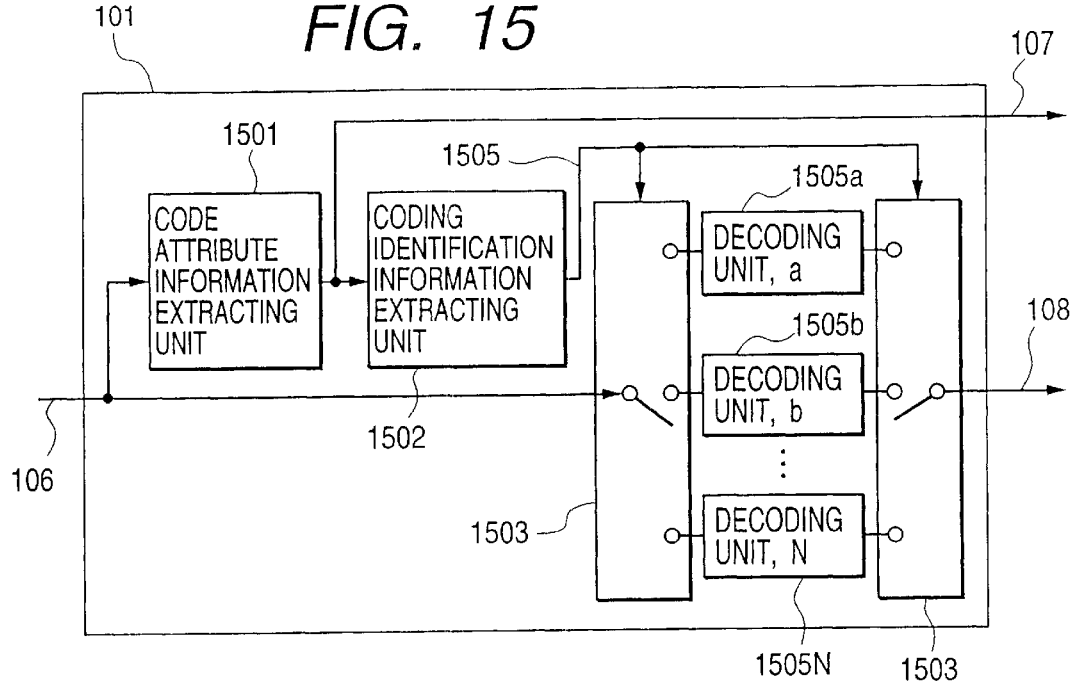
FIG. 15 is a schematic block diagram of a coded image information decoding unit used in the fifth embodiment.
Figure 16:
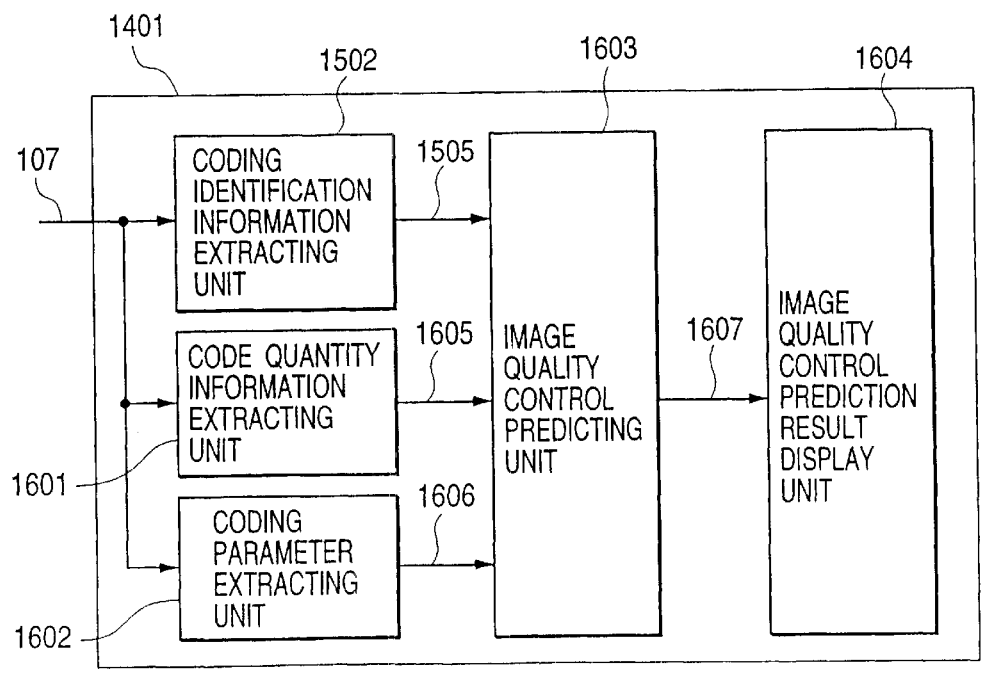
FIG. 16 is a schematic block diagram of an image quality control prediction notifying unit used in the fifth embodiment.

FIG. 15 is a block diagram showing the configuration of a coded image information decoding unit 101 used in this embodiment, and FIG. 16 is a block diagram showing the configuration of the image quality control prediction notifying unit 1401.

In these figures, the numeral 1501 denotes a code attribute information extracting unit, numeral 1502 denotes a coding identification information extracting unit, numeral 1503 denotes a coded image information decoding unit selecting unit, numeral 1504 denotes coded image information decoding unit, and numeral 1505 denotes a coding identification information.

The numeral 1601 denotes a code quantity information extracting unit, numeral 1602 denotes a coding parameter extracting unit, numeral 1603 denotes an image quality control predicting unit, numeral 1604 denotes an image quality control prediction result display unit, numeral 1605 denotes code quantity information, numeral 1606 denotes coding parameter information, and numeral 1607 denotes image quality control prediction result information.

In FIG. 15, the code attribute information extracting unit 1501 decodes and extracts only attribute information such as a coding parameter from the coded image information 106 and outputs it as the code attribute information 107. The coding identification information extracting unit 1502 extracts from the code attribute information 107 an information piece indicative of a coding method which has generated the coded image information 106, and outputs it as the coding identification information 1505. The coded image information decoding unit selecting unit 1503 selects the coded image information decoding unit 1504 corresponding to the coding identification information 1505. The coded image information decoding unit 1504 thus selected decodes the coded image information 106 and outputs the decoded image information 108.

In FIG. 16, the coding identification information extracting unit 1502 extracts from the code attribute information 107 an information piece indicative of a coding method which has generated the coded image information 106, and outputs it as the coding identification information 1505. The code quantity information extracting unit 1601 extracts from the code attribute information 107 an information piece indicative of a code quantity of the coded image information 106 and outputs it as the code quantity information 1605. The coding parameter extracting unit 1602 extracts from the code attribute information 107 an information piece indicative of a coding parameter used in the generation of the coded image information 106 and outputs it as the coding parameter information 1606. In accordance with the coding identification information 1505, the image quality control predicting unit 1603 predicts the type of the image quality degradation generated in the coded image information 106, further predicts the degree of image degradation of the coded image information 106 from both code quantity information 1605 and coding parameter information 1606, and outputs the results of the predictions together as the image quality control prediction result information 1607. The image quality control prediction result display unit 1604 displays the image quality control prediction result information 1607.

The reason why not only the coding parameter information 1606 but also the code quantity information 1605 is used in predicting the degree of image quality degradation of the coded image information 106 is because whether the original image was easy to be compressed or not can be predicted from the relation between the coding parameter and the code quantity.

The image quality control prediction result information 1607 notifies the user of the result of having predicted what image quality degradation was originally generated in the coded image 106 and to what degree it was. This makes it possible to determine whether the execution of image quality control will be meaningful or not at the time of recording. If marked image quality degradation was originally generated in the coded image, coding may be carried out with considerable attention paid to only the compression rate without making image quality control.

According to the present invention, as set forth hereinabove, it is possible to provide a coding technique which, in the case of subjecting a coded image once to decoding and thereafter coding in a coding system involving the execution of image quality control, utilizes an attribute information of the coded image and thereby implements highly accurate image quality control. In the present invention, even in the case of once decoding a coded image and thereafter coding the thus-decoded image, it is not necessary to newly add an image analyzing means for the decoded image or an image quality improving means, so it is possible to prevent the scale of the coding system from becoming large and hence possible to keep the cost low. Further, when the image quality degradation of the decoded image to be coded is marked, it is possible to prevent the compression rate from being made low by meaningless image quality control and it is possible to notify the user that the image quality control cannot be done to a satisfactory extent.

What is claimed is:

1. An image information coding system comprising:
    coded image information decoding means for decoding input coded image information and outputting first decoded image information and code attribute information;
    image information dividing means for dividing the first decoded image information outputted from said decoding means into rectangular regions consisting of a predetermined number of pixels;
    image information analyzing means for measuring a statistic of divided image information outputted from said image information dividing means and analyzing to what degree said divided image information is apt to be degraded in its image quality by coding, said image information analyzing means then outputting image quality control information;
    coding parameter control means for deciding a coding parameter for obtaining a desired image quality with respect to second decoded image information in accordance with said image quality control information, said second decoded image information being the result of coding and decoding of said first decoded image information; and
    image information coding means for encoding said divided image information with use of the coding parameter outputted from said coding parameter control means,
    wherein said image information analyzing means predicts the degradation of said first decoded image information and the degree of influence thereof on the image information analysis on the basis of the code attribute information outputted from said coded image information decoding means, then makes correction in accordance with the result of said prediction, and thereafter analyzes said divided image information.

2. The image information coding system according to claim 1, wherein said image information analyzing means comprises:
    analysis parameter deciding means for deciding a parameter for statistic measurement; and
    image analysis value calculating means for, with use of an analysis parameter outputted from said analysis parameter deciding means, measuring the statistic of said divided image information and outputs image control information, and wherein
    said analysis parameter deciding means predicts the degradation of said first decoded image information and the degree of influence thereof on the image information analysis on the basis of the code attribute information outputted from said coded image information decoding means, and decides said analysis parameter in accordance with the result of said prediction.

3. The image information coding system according to claim 1, wherein said image information analyzing means comprises:
    at least one image quality degradation item-by-item image information analyzing means for measuring the statistic of said divided image information outputted from said image information dividing means and analyzing to what degree said divided image information is apt to be degraded in its image quality by coding with respect to a single image quality degradation item; and
    image quality control information calculating means for calculating image quality control information from at least one piece of image quality degradation item-by-item image analysis information outputted from said image quality degradation item-by-item image information analyzing means, and wherein
    said image quality degradation item-by-item image information analyzing means predicts the degradation of said first decoded image information and the degree of influence thereof on the image information analysis on the basis of the code attribute information outputted from said coded image information decoding means, then makes correction in accordance with the result of said prediction and thereafter analyzes the divided image information.

4. The image information coding system according to claim 3, wherein said image quality degradation item-by-item image information analyzing means comprises:
    image quality degradation item-by-item analysis parameter deciding means for deciding a parameter for statistic measurement; and
    image quality degradation item-by-item image analysis value calculating means for measuring the statistic of said divided image information with use of an image quality degradation item-by-item analysis parameter outputted from said image quality degradation item-by-item analysis parameter deciding means, and wherein said image quality degradation item-by-item analysis parameter deciding means predicts the degradation of said first decoded image information and the degree of influence thereof on the image information analysis on the basis of the code attribute information outputted from said coded image information decoding means, and decides said image quality degradation item-by-item analysis parameter in accordance with the result of said prediction.

5. The image information coding system according to claim 3, wherein said image information analyzing means comprises:

at least one image degradation item-by-item image information analyzing means for measuring the statistic of said divided image information outputted from said image information dividing means and analyzing to what degree said divided image information is apt to be degraded in its image quality by coding with respect to a single image degradation item;

analysis value calculation coefficient deciding means for deciding a calculation coefficient; and image quality control information calculating means that uses said calculation coefficient outputted from said analysis value calculation coefficient deciding means in the case of calculating an image quality control information from at least one piece of image quality degradation item-by-item image analysis information outputted from said image quality degradation item-by-item image information analyzing means, and wherein said analysis value calculation coefficient deciding means predicts the degradation of said first decoded image information and the degree of influence thereof on the image information analysis on the basis of the code attribute information outputted from said coded image information decoding means, and decides said calculation coefficient in accordance with the result of said prediction.

6. The image information coding system according to claim 1, wherein said coding parameter control means predicts the degradation of said first decoded image information and the degree of influence thereof on the image information analysis on the basis of the code attribute information outputted from said coded image information decoding means, and decides the coding parameter in accordance with result of said prediction.

7. The image information coding system according to claim 6, wherein said coding parameter control means comprises:

coding parameter limit value deciding means; and coding parameter deciding means, and wherein said coding parameter limit value deciding means predicts the degradation of said first decoded image information and the degree of influence thereof on the image information analysis on the basis of the code attribute information outputted from said coded image information decoding means, and decides and outputs a coding parameter limit value in accordance with the result of said prediction.

8. The image information coding system according to claim 1, wherein said code attribute information contains a first coding parameter which has been used at the time of generating said coded image information.

9. The image information coding system according to claim 1, wherein said code attribute information contains a code quantity of said coded image information.

10. The image information coding system according to claim 1, wherein said code attribute information contains a coding means identifying information which represents the type of coding means which has generated said coded image information.

11. The image information coding system according to claim 1, further comprising:

image quality control prediction means for predicting whether the image quality control is proper or not; and image quality control prediction result notifying means for notifying image quality control prediction result information outputted from said image quality control prediction means, wherein said image quality control prediction means predicts whether the image quality control is proper or not on the basis of the value of the code attribute information outputted from said coded image information decoding means.

* * * * *